US012800309B2

(12) United States Patent
Wirtschafter et al.

(10) Patent No.: US 12,800,309 B2
(45) Date of Patent: Nov. 17, 2026

(54) ATOM CHIP HAVING A CONDUCTIVE SURFACE FOR AN ULTRA-COLD ATOM INERTIAL SENSOR, AND ASSOCIATED SENSOR

(71) Applicant: THALES, Courbevoie (FR)

(72) Inventors: Benjamin Wirtschafter, Palaiseau (FR); Matthieu Dupont-Nivet, Palaiseau (FR)

(73) Assignee: THALES, Courbevoie (FR)

( * ) Notice: Subject to any disclaimer, the term of this patent is extended or adjusted under 35 U.S.C. 154(b) by 210 days.

(21) Appl. No.: 18/951,063

(22) Filed: Nov. 18, 2024

(65) Prior Publication Data

US 2025/0076056 A1 Mar. 6, 2025

Related U.S. Application Data

(62) Division of application No. 17/832,615, filed on Jun. 4, 2022, now Pat. No. 12,181,283.

(30) Foreign Application Priority Data

Jun. 10, 2021 (FR) ...................................... 2106120

(51) Int. Cl.
*G01C 19/64* (2006.01)

(52) U.S. Cl.
CPC .................................. *G01C 19/64* (2013.01)

(58) Field of Classification Search
None
See application file for complete search history.

(56) References Cited

U.S. PATENT DOCUMENTS

| | | | | |
|---|---|---|---|---|
| 11,740,090 | B2 | 8/2023 | Wirtschafter et al. | |
| 12,385,741 | B2 * | 8/2025 | Garrido Alzar ........ | G01C 19/64 |
| 2018/0352642 | A1 * | 12/2018 | Dupont-Nivet ........ | G01C 19/64 |

FOREIGN PATENT DOCUMENTS

| | | | |
|---|---|---|---|
| WO | 2017/089489 | A1 | 6/2017 |
| WO | 2021/228722 | A1 | 11/2021 |

OTHER PUBLICATIONS

Ammar, et al., "Symmetric microwave potentials for interferometry with thermal atoms on a chip", Phys. Rev., A 91, 053623, May 2015.

* cited by examiner

*Primary Examiner* — Stephen D Meier
*Assistant Examiner* — Ruben C Parco, Jr.
(74) *Attorney, Agent, or Firm* — BakerHostetler

(57) ABSTRACT

An atom chip (Ach) for an ultra-cold atom sensor, includes a measurement plane XY of the atom chip comprising: a plurality of first pairs of waveguides, a plurality of second pairs of waveguides, the projections in the plane XY of the first pair furthest from X and of the second pair furthest from Y' forming, at their intersection, a parallelogram with a centre O, a first conductive wire having a projection in the plane XY along X or Y' or a diagonal of the parallelogram, the first conductive wire being designed to be flowed through by a DC current, the first wire having a flaring so as to take the form of a surface whose projection in the plane XY incorporates the parallelogram and exhibits symmetry about the point O.

4 Claims, 27 Drawing Sheets

ATOM CHIP HAVING A CONDUCTIVE SURFACE FOR AN ULTRA-COLD ATOM INERTIAL SENSOR, AND ASSOCIATED SENSOR

CROSS-REFERENCE TO RELATED APPLICATIONS

This application is divisional of pending U.S. application Ser. No. 17/832,615, filed Jun. 4, 2022, which claims priority to foreign French patent application No. FR 2106120, filed on Jun. 10, 2021, the disclosures of which are incorporated by reference in their entireties.

FIELD OF THE INVENTION

The present invention relates to the field of ultra-cold atom inertial sensors. The invention relates more particularly to chips and the associated sensors for measuring an angular velocity along one or three measurement axes. ωBACKGROUND Document WO2017089489 describes an ultra-cold atom inertial sensor (gyroscope) on a chip using trapped matter waves describing closed paths enclosing an area, the structure and operating principle of which are recalled below.

Rotational measurements on this type of device are performed by utilizing the Sagnac effect. The phase shift θ, induced by the Sagnac effect, between two counter-rotating matter waves in a reference frame rotating at the angular velocity Ω, is given by:

$$\theta = \frac{2Am}{\hbar}\Omega \tag{1}$$

where A is the area contained in the atomic paths, m is the mass of the atoms and $\hbar$ is the reduced Planck constant.

Ultra-cold atoms are defined as atoms whose temperature is below 400 nanokelvin, preferably 300 nanokelvin. The temperature of thermal ultra-cold atoms is, for example for rubidium atoms, between 50 and 400 nanokelvin, and preferably between 100 and 300 nanokelvin.

The principle is that of creating a path that is travelled by two clouds of magnetically trapped atoms in a manner propagating against one another. The creation and the movement of the magnetic trap along the path are achieved using conductive wires and microwave guides using for example the topology illustrated in FIG. 1.

FIG. 1 schematically illustrates an ultra-cold atom 12 chip 1, as well as the path 16 of two clouds of atoms N1 and N2. Part of the surface of the chip 1 forms a measurement plane 13. An axis normal to the measurement plane 13 defines the measurement axis Z, along which a rotational measurement Ωz is carried out by the gyrometer.

The chip 1 comprises means designed to generate a first ultra-cold atom trap T1 and a second ultra-cold atom trap T2, one trap making it possible to immobilize a cloud of ultra-cold atoms 12 in an internal state different from the other trap, at a predetermined distance h from said measurement plane 13. For example, the trap T1 comprises the atoms in the electron level or state |a> (cloud N1) and the trap T2 comprises atoms in the state |b> (cloud N2). The levels |a> and |b> are spaced by a frequency ω0/2π. For example, in the case of rubidium 87, these are two super-fine levels |F=1, m−F=−1> and |F=2, m−F=1>, spaced by around 6.8 GHz.

These means also make it possible to move the clouds along the path 16 located in a plane parallel to the measurement plane 13, at a height h from this plane, as illustrated in FIG. 1.

These means consist of waveguides and conductive wires as described below.

The means comprise a first waveguide CPW1 and a second waveguide CPW2 that are designed to propagate microwaves at angular frequencies ωa and ωb. The waveguides are parallel and positioned symmetrically about an axis Y of the measurement plane. The two waveguides CPW1 and CPW2 are connected to at least one microwave-frequency current or voltage generator. For example, each of the waveguides is produced by depositing three parallel conductive wires so as to produce a coplanar waveguide. In other embodiments, it is possible to use other types of waveguide, in particular waveguides whose manufacture is compatible with deposition or etching micro-manufacturing techniques. It is possible to produce a microstrip line, for example.

The means also comprise conductive wires integrated into the chip 1 and designed to be flowed through by DC currents. The conductive wires are distributed into one conductive wire WIz along an axis of symmetry Y perpendicular to X and contained within the measurement plane 13, and into a plurality of n conductive wires WIdi, the index i varying from 1 to n, parallel to one another and parallel to the axis X, n being at least equal to 2. In the example of FIG. 1 n=3, i.e. three conductive wires WId1, WId2 and WId3. The wires are arranged so as to define n points of intersection Ci (intersection between WIz and WIdi) located on the axis Y, here 3 points of intersection C1, C2, C3.

Each conductive wire is linked to one or more current and/or voltage generators, which generators are themselves linked to a processing unit comprising at least one microprocessor. The voltage and/or current generators make it possible to control both DC currents and AC currents in the wires. In particular, DC currents are controlled in the conductive wires.

In the sensor, the atom chip 1 is placed in a vacuum chamber maintained under vacuum, for example, using an ion pump and preferably having magnetic shielding. The vacuum chamber comprises an ultra-cold atom source. The ultra-cold atom source is defined by:

- an atom dispenser, for example formed by a heating filament delivering a rubidium vapour;
- a primary (optical and/or magnetic) atom trap, called MOT, making it possible to pre-cool the atoms and a loading device for positioning the cloud of ultra-cold atoms from the MOT in the vicinity of the chip, so as to load the magnetic traps T1 and T2 that are described later on with atoms.

The vacuum chamber also comprises a magnetic field source, external to the chip 1. It makes it possible to impose a homogeneous and steady magnetic field 20 over a thickness at least of the order of a height h above the measurement plane 13. Advantageously, the direction of the homogeneous magnetic field is parallel to the measurement plane.

In FIG. 1, the path 16 in dashed lines illustrates the path of the clouds of ultra-cold atoms 12. This closed path defines an area denoted A. A distance h separates the plane of the path 16 and the measurement plane 13 of the chip. Preferably, h is between 500 nm and 1 mm, and preferably between 5 μm and 500 μm.

FIG. 2 illustrates the geometry of the guides and wires of the atom chip as well as the traps T1 and T2. The generation and operating principle of these traps are described in the publication by Ammar et al. "Symmetric microwave potential for interferometry with thermal atoms on a chip" Phys. Rev. A91, 053623 (2015).

The specific arrangement of the conductive wires and waveguides, in combination with the homogeneous magnetic field source, makes it possible to easily obtain two traps T1 and T2 as illustrated in part a) of FIG. 2. Each trap T1 and T2 has a non-zero and identical value of the minimum V0 and an identical curvature, a condition needed for the sensor to work. Specifically, as explained further on, when a DC current is applied to at least two conductive wires of a point of intersection, the potential minimum is located at the vertical of this point of intersection. When a microwave power is then sent into the waveguides, the central minimum transforms into two minima on either side of the initial minimum in the direction of the waveguides. If the initial minimum is not situated strictly at an equal distance from the two waveguides, the two potential minima that are created will not have precisely the same value of the minimum V0 and the same curvature.

Part c) of FIG. 2 illustrates the arrangement of the conductive wires defining the initial point of intersection C1 and the waveguides (plan view). Part b) of FIG. 2 describes the corresponding arrangement of the conductive wires and waveguides printed on a chip in a profile view, in cross section along the conductive wire WId1 that intersects the conductive wire WIz along the axis of symmetry Y. The waveguides CPW1 and CPW2 are coplanar waveguides situated on a first level N1. The insulating layer 18 advantageously makes it possible to flatten the measurement plane. The material of the layer of electrical insulator may be for example silicon dioxide, silicon nitride or benzocyclobutene. A conductive material is used to manufacture the conductive wires, for example gold, and is deposited on a substrate 15, forming a second level N2. The substrate may be made for example of silicon, of aluminium nitride or of silicon carbide.

Part a) shows the symmetrical separation of ultra-cold atoms, specific to the internal state of said ultra-cold atoms, and more precisely the variations in potential as a function of the axis X of the chip 1.

The curve "a" in black shows a potential well corresponding to the combination of the homogeneous magnetic field and of the field created by two secant conductive wires, the wire WIz flowed through by the current IZ and the wire WId1 flowed through by the current Id1. This results in a local potential well forming an atom trap T in three dimensions, a DC magnetic trap. A cloud of ultra-cold atoms is able to be trapped and cooled there.

The curve "b" in light grey dashed lines schematically shows the potential created by the transmission of microwaves at the frequency ωb in the waveguide CPW1. The field emitted by the passage of microwaves at the frequency ωb makes it possible to modify the energy of the ultra-cold atoms and to move the atoms with internal states |b>. The curve "e" in a light grey unbroken line illustrates the potential seen by the internal states |b> due to the contributions of the potentials illustrated by the curve "a" and by the curve "b". The curve "e" exhibits a local potential minimum that makes it possible to locally trap a cloud of ultra-cold atoms with internal states |b>. The microwave field emitted at ωb in CPW1 thus "pushes" the atoms in the state |b> from the side opposite the waveguide CPW1.

Similarly, the curve "d" in dark grey dashed lines schematically shows the potential created by the transmission of microwaves at the frequency ωa in the waveguide CPW2. The field emitted by the passage of microwaves at the frequency ωa makes it possible to modify the energy of the ultra-cold atoms and to move the atoms with internal states |a>. The curve "c" in a dark grey unbroken line illustrates the potential seen by the atoms with internal states |a> due to the contributions of the potentials illustrated by the curve "a" and by the curve "d". The curve "c" exhibits a local energy minimum that makes it possible to locally trap a cloud of ultra-cold atoms with internal states |a>. The microwave field emitted at ωa in CPW2 thus "pushes" the atoms in the state |a> from the side opposite the waveguide CPW2.

The combination of a DC magnetic trap (created by the DC currents in the wires and the homogeneous field 20) and of a microwave field creates what is called a "dressed" trap. "Dressed" is understood to mean a trap created at least partially by an oscillating microwave, radiofrequency or optical field. The changes in the microwave fields (power, frequency and guide in which they propagate) make it possible to move this dressed trap and therefore to move the atoms. The DC magnetic trap is represented in FIG. 2 by the curve a. The microwave field at ωa is represented in FIG. 2 by the curve d and the microwave field at ωb is represented in FIG. 2 by the curve b. The dressed trap T1 (combination of curves a and d) for the state |a> is represented by the curve c and the dressed trap T2 (combination of curves a and b) for the state |b> is represented by the curve e.

The clouds of ultra-cold atoms with internal states |a> and |b> may be separated and trapped symmetrically about the axis of symmetry Y by simultaneously imposing the propagation of waves of frequency ωa in CPW2 and ωb in CPW1. To obtain two traps whose minima have the same value V0 and whose curvatures have the same value, it is vital for the point of intersection C1 to be positioned at an equal distance from CPW1 and CPW2, on the axis of symmetry Y.

FIG. 3 illustrates the principle of generating the path 16. Part a) of FIG. 3 schematically shows a sequence of the movement of each of the clouds of ultra-cold atoms at characteristic times t0 to t8. Part b) illustrates, in a complementary manner, a sequence of the various currents applied to the conductive wires, the powers applied to the waveguides and the frequencies imposed on the waveguides, for times corresponding to those of part a).

In the sequence shown in FIG. 3, the current IZ, not shown, flowing in WIz is steady, at a constant value. In part b), the values of the currents, of the powers and of the frequencies are arbitrary. The ordinate δ frequency corresponds to a frequency variation expressed in arbitrary units, around an average value of the frequency. The currents flowing through the conductive wires may be between 100 μA and 10 A, and the angular frequencies injected into the waveguides may be between 6.6 GHz and 7 GHz if rubidium atoms are used.

In a step A0, there is a phase of preparing the atoms. This involves generating a cloud of ultra-cold atoms 12, including phases of dispensing said atoms, of cooling said atoms, of initializing said atoms in at least one internal state |a> and of trapping a cloud of said ultra-cold atoms in a local potential minimum, at a distance h from the measurement plane (trap T, curve "a" of FIG. 2 part a)). The height h is other than 0 since the homogeneous magnetic field 20 is non-zero. The trapping is achieved through the flow of DC currents in the wire WIz and in one of the wires WIdi, the point of intersection of these two wires defining the starting point (here C1 with WId1). At the same time, a bias magnetic field 20 is applied parallel to the plane of the atom chip, which is superposed on the magnetic field created by the previous two wires. The cloud of atoms is then trapped vertical to C1, intersection of the wires WIz and WId1.

In a step B0, the internal states are initialized by coherently superposing said ultra-cold atoms between said states |a> and |b> through a first pulse π□/2. This pulse may be produced using a laser, a microwave emission, or more generally using a method emitting waves at a suitable transition frequency. The currents IZ and Id1 are imposed respectively on the conductive wires WIz and WId1. The two internal states |a> and |b> are superposed coherently and spatially plumb to the point of intersection C1. This corresponds to the time to for which the two clouds are in one and the same trap T.

The wave function is then:

$$\frac{|a> + |b>}{\sqrt{2}} \tag{2}$$

In a step C0, a cloud of atoms with an internal state |a> in a trap T1 is spatially separated from a cloud of atoms with an internal state |b> in another trap T2 and the traps are moved in opposing directions along a closed path 16 contained within a plane perpendicular to the measurement axis Z. The cloud of atoms with internal states |a> is symbolized by a disc with a dark texture and the cloud of atoms with internal states |b> is symbolized by a disc with a lighter texture. This step is performed from t0 to t8.

Between t0 and t1, the microwave power injected into the waveguides CPW1 and CPW2 changes gradually from 0 to its maximum value. An angular frequency ωa is sent into the waveguide CPW1 and an angular frequency ωb is sent into the waveguide CPW2, thereby making it possible to separate the two clouds with different internal states onto either side of the axis of symmetry Y, by a distance d, to the positions depicted schematically in t1. The ultra-cold atom trap T described above at the time to is then transformed into two ultra-cold atom traps T1 and T2, each trap making it possible to immobilize a cloud of ultra-cold atoms with internal states different from the other trap (in this case with internal states |a> in one of the traps, for example T1, and with internal states |b> in the other trap T2, as described in part a) of FIG. 2).

A point of intersection Ci corresponds to the intersection of the wire WIz with the wire WIdi.

Between t1 and t2, the current Id1 is gradually cut off and Id2 is gradually brought to its maximum value (the time interval separating t1 and t2 is typically of the order of 10 ms and may be between 0.1 ms and 100 ms): the two traps T1 and T2 are moved to the right to the positions depicted schematically in t2.

Between t2 and t3, the current Id2 is gradually cut off and Id3 is gradually brought to its maximum value: the two traps are moved to the right to the positions depicted schematically in t4.

Between t3 and t4, the microwave power is gradually cut off: the two traps are brought to the same location on the chip, outlined schematically in t4.

At t4, the angular frequencies of the two microwave guides are modified: the angular frequency ωb is imposed in CPW1 and the angular frequency ωa is imposed in CPW2.

Between t4 and t5, the power in the two waveguides changes gradually from 0 to its maximum value: the traps are separated in the vertical direction, as depicted schematically in the Figure t5.

Between t5 and t6, the current Id3 is gradually cut off and Id2 is gradually brought to its maximum value: the two traps T1 and T2 are moved to the left to the positions depicted schematically in t6.

Between t6 and t7, the current Id2 is gradually cut off and Id1 is gradually brought to its maximum value: the two traps are moved to the left to the positions depicted schematically in t7. This operation may be repeated multiple times with further first conductive wires so as to increase the area contained within the path 16.

Between $t_7$ and $t_8$, the microwave power in the waveguides is gradually cut off. The two traps T1 and T2 move until merging into a single trap situated at the starting point depicted schematically in t1.

DC currents are thus applied to the two wires corresponding to the initial point of intersection C1, and over time these currents are applied successively to the various points of intersection Ci situated on the axis of symmetry, while simultaneously applying a microwave power to the waveguides.

During step C0, the DC currents applied to the various wires Widi vary continuously (increase and decrease) between 0 and a maximum value Idimax (normalized at 1 in FIG. 3), while the magnetic field 20 and the current Iz remain constant during the sequence. Throughout the sequence A0, B0 and C0 the two traps T1 and T2 remain at the altitude h.

The two traps T1 and T2 move in the direction of "activation" of the points of intersection: from the point of intersection C1 to the point of intersection Cn. The return is made by reversing the microwave frequencies and by activating the DC currents successively in the wires corresponding to the various points of intersection by going through them from Cn to C1.

The traps are thus made to run through the closed path 16.

The closed path 16 of the atoms then contains an area A, and the atomic wave function is therefore:

$$\frac{|a> + \exp(i\varphi)|b>}{\sqrt{2}} \tag{3}$$

$$\varphi = \omega_0 t + \frac{m}{\hbar}\Omega_Z A \tag{4}$$

Where:

$\Omega_z$ is the angular rotational velocity along the axis Z and $\omega_0$ is the angular frequency corresponding to the electron transition energy between |a> and |b>.

In a step D0, the internal states |a> and |b> are recombined by applying a second pulse π/2 to the ultra-cold atoms, which transfers the phase difference to the populations of the two atomic levels:

$$p_a = \frac{1}{2}[1 + \cos(\varphi - \omega t)] \tag{5}$$

$$p_b = \frac{1}{2}[1 - \cos(\varphi - \omega t)] \tag{6}$$

where ω is the angular frequency of the pulse π/2.

The pulses π/2 may be sent to the atoms via the microwave guides or via a separate microwave emitter.

The density of atoms in an internal state chosen from at least |a> and |b> is then measured. This measurement may be performed for example by laser absorption while sampling the resonance between the angular frequency specific to an internal state and that of the laser.

Lastly, in a step E0, the Sagnac phase of the ultra-cold atoms is determined and the rotational velocity of the sensor along the axis Z is calculated.

Measuring at least one population of atoms in one of the states |a> or |b> makes it possible to determine the Sagnac phase, for example for the internal state |a> by considering equation (5), and then the rotational velocity Ωz with equation (1).

"Phase of free evolution" is the name given to that part of the interferometry sequence situated between the two pulses π/2, i.e. step C0.

The traps may be made to run through this path N times before measuring the Sagnac phase, and a phase that will potentially be N times higher may thus be measured.

The measurement thus takes place by moving the minimum of the magnetic field containing the two dressed traps (trap created at least partially by the microwave oscillating field) by varying the DC currents in a certain way in the matrix of wires present on the chip (gradual activation and gradual deactivation of the DC wires in a cross), such that the greatest possible area is obtained.

In order to implement the method described above, the ultra-cold atom sensor for measuring a rotational velocity $\Omega_z$ comprises:

- an atom chip 1 as described above, with the waveguides and the conductive wires,
- an atom source for generating the cloud of ultra-cold atoms close to the measurement plane 13 of the atom chip,
- a generator for generating the homogeneous magnetic field 20
- at least one processor, at least one DC current or voltage generator designed to control electric currents in the conductive wires, and at least one microwave current or voltage generator connected to the waveguides,
- an optical intensity detection system designed to measure at least one population of ultra-cold atoms in an internal state, this measurement making it possible to determine the Sagnac phase and the rotational velocity $\Omega_z$.

This sensor described above and in document WO2017089489 makes it possible, from a path contained within a plane parallel to the measurement plane 13, only to measure rotational velocity along the axis Z perpendicular to the plane of the chip. In order to be able to measure the rotational velocity along three axes, it is necessary to have 3 sensors of this type, this being expensive, burdensome and complex to implement, particularly for the respective positioning of the three axes (adjustment and their orthogonality), this adjustment exhibiting temporal drift that decreases the accuracy of the assembly. In addition, measuring Ωz requires a chip with multiple parallel conductive wires WIdi. The presence of these multiple wires, to which various DC voltages are successively applied, complicates the chip and the sequence of separating/moving the traps.

SUMMARY OF THE INVENTION

One aim of the present invention is to rectify the above-mentioned drawbacks by proposing a simplified atom chip and sensors based on this chip, capable of performing a rotational velocity measurement along the axis Z, but also a rotational velocity measurement along three perpendicular axes X, Y and Z. In addition, the chip according to the invention and the associated sensor exhibit increased sensitivity.

One subject of the present invention is an atom chip for an ultra-cold atom sensor, comprising a measurement plane XY defined by an axis X and an axis Y that are orthogonal, said measurement plane being normal to an axis Z, the atom chip comprising:

- a plurality of first pairs of waveguides, a first pair consisting of a first and a second waveguide that are coplanar, parallel to one another and arranged symmetrically on either side of an axis whose projection in the plane XY is along the axis X, called pairs of guides along X,
- a plurality of second pairs of waveguides, a second pair consisting of a first and a second waveguide that are coplanar, parallel to one another and arranged symmetrically on either side of an axis whose projection in the plane XY is along an axis Y' different from the axis X, called pairs of guides along Y',
- the pairs of guides along X being electrically insulated from the pairs of guides along Y';
- the projections in the plane XY of the first pair furthest from X and of the second pair furthest from Y' forming, at their intersection, a parallelogram with a centre O,
- a first conductive wire having a projection in the plane XY along X or Y' or a diagonal of said parallelogram, the first conductive wire being designed to be flowed through by a DC current,
- said first wire having a flaring so as to take the form of a surface whose projection in the plane XY incorporates said parallelogram and exhibits symmetry about the point O.

According to one embodiment, the chip furthermore comprises a second conductive wire coplanar with the first conductive wire, the first and the second wires being oriented respectively along X and Y' or vice versa, or along a first and a second diagonal of the parallelogram or vice versa.

According to one embodiment, the axis Y' is coincident with the axis Y.

According to one embodiment, said surface is chosen from among: an oval, a circle, a polygon, a rectangle, a square.

According to one embodiment, the chip furthermore comprises a first and a second loading wire that are conductive and electrically insulated from the one or more conductive wires and whose projections in the plane XY are secant at O.

According to one embodiment of the chip comprising two conductive wires, the projections of the loading wires coincide with the projections of the conductive wires outside the surface.

According to one embodiment, the guides along X, the guides along Y', the one or more conductive wires and the loading wires each occupy a different level of the chip. Preferably, the loading wires occupy the level of the chip furthest from the measurement plane.

According to another aspect, the invention relates to an ultra-cold atom sensor allowing a rotational velocity measurement along at least the axis Z comprising:

- an atom chip according to the invention placed in a vacuum chamber,
- an atom source designed to generate a cloud of ultra-cold atoms close to said plane XY of said atom chip;
- said ultra-cold atoms having, in the phase of initializing the implementation of the sensor, a superposition of internal states |a> and |b>
- a generator for generating a homogeneous magnetic field,
- at least one processor, at least one DC current or voltage generator connected to said conductive wires, and at least one microwave current or voltage generator connected to said waveguides,
- said waveguides and said conductive wires being configured, in the phase of implementing the sensor, so as to:

modify the energy of said ultra-cold atoms so as to create a potential minimum for the ultra-cold atoms in the internal state |a> and a potential minimum for the ultra-cold atoms in the internal state |b>, thus forming a first and second ultra-cold atom trap, a trap making it possible to immobilize a cloud of ultra-cold atoms (12) in an internal state different from the other trap, at a controlled distance from said measurement plane, and spatially separate the two traps and move said traps along at least one first closed path contained within a plane perpendicular to Z, and travelled in one direction by the ultra-cold atoms of the first trap and in the opposite direction by the ultra-cold atoms of the second trap, the sensor furthermore comprising an optical intensity detection system designed to measure at least one population of said ultra-cold atoms in one said internal state.

According to one embodiment, in the sequence of separating and moving said traps:

at least the guides along X of the first pair closest to the axis X are passed through simultaneously by microwave signals with angular frequencies ωa or ωb, at certain times called first set of times, at least one of the guides along Y' of at least the second pair closest to Y' is passed through by a microwave signal formed by the superposition of a microwave signal at an angular frequency ωa' and a microwave signal with an angular frequency ωb', at certain times called second set of times, the one or more conductive wires each being flowed through by a constant current during the separation, the movement and the recombination of said traps.

According to one embodiment, the guides along X of the other first pairs are also successively passed through simultaneously by microwave signals with angular frequencies ωa or ωb, at certain times different from the first set of times.

According to one embodiment in the sequence of separating and moving said traps:

at least the guides along Y' of the second pair closest to the axis Y' are passed through simultaneously by microwave signals with angular frequencies ωa' or ωb', at certain times called first set of times, at least one of the guides along X of at least the first pair closest to X is passed through by a microwave signal formed by the superposition of a microwave signal at an angular frequency ωa and a microwave signal with an angular frequency ωb, at certain times called second set of times having times in common with the first set of times, the one or more conductive wires each being flowed through by a constant current during the separation, the movement and the recombination of said traps.

According to one embodiment, the guides along Y' of the other second pairs are also successively passed through simultaneously by microwave signals with angular frequencies ωa' or ωb', at certain times different from the first set of times.

According to one embodiment, the sensor furthermore allows a rotational velocity measurement along the axes X and Y', and said waveguides and the one or more conductive wires are furthermore configured so as to move said traps along a second closed path contained within a plane perpendicular to X, during the rotational velocity measurement along the axis X, to move said traps along a third closed path contained within a plane perpendicular to Y', during the rotational velocity measurement along the axis Y, said closed paths being travelled in one direction by the ultra-cold atoms of the first trap and in the opposite direction by the ultra-cold atoms of the second trap, the second and third paths each comprising at least one first portion located at a first height from the plane XY and a second portion located at a second height strictly greater than the first height.

According to one embodiment of the sensor according to the invention, when implementing the measurement of the rotational velocity along the axis X by generating the second closed path, at least the guides along X of the first pair closest to X are passed through simultaneously by microwave signals with angular frequencies ωa or ωb, at certain times called third set of times, the guides along Y' of the second pair closest to the axis Y' are simultaneously passed through by a microwave signal formed by the superposition of a microwave signal at an angular frequency ωa' and a microwave signal with an angular frequency ωb' in order to switch from the first height to the second height, at certain times called fourth set of times having times in common with the third set of times, the one or more conductive wires are each flowed through by a constant current during the separation, the movement and the recombination of said traps.

According to one embodiment of the sensor according to the invention, the guides along X of the other first pairs are successively passed through simultaneously by microwave signals with angular frequencies ωa or ωb, at certain times different from the third set of times.

According to one embodiment of the sensor according to the invention, when implementing the measurement of the rotational velocity along the axis Y' by generating the third closed path, at least the guides along Y' of the second pair closest to the axis Y' are passed through simultaneously by microwave signals with angular frequencies ωa' or ωb', at certain times called third set of times, the waveguides along X of the first pair closest to X are simultaneously passed through by a microwave signal formed by the superposition of a microwave signal at an angular frequency ωa and a microwave signal with an angular frequency ωb in order to switch from the first height to the second height, at certain times called fourth set of times having times in common with the third set of times, the one or more conductive wires are each flowed through by a constant current during the separation, the movement and the recombination of said traps.

According to one embodiment, the guides along Y' of the other second pairs are successively passed through simultaneously by microwave signals with angular frequencies ωa' or ωb', at certain times different from the third set of times.

According to another aspect, the invention relates to a matrix atom chip comprising:

a first set of N first conductive wires indexed n and a second set of M second conductive wires indexed m that are perpendicular to one another and respectively form N rows and M columns of a matrix, each of the first conductive wires indexed n and the second conductive wires indexed m being coincident respectively with an axis Xn indexed n and an axis Ym indexed m, the first pairs of guides along Xn thus being common to all of the pixels of the row n and the second pairs of guides along Ym thus being common to all of the pixels of the column m, each pixel of the matrix forming an elementary chip.

According to one embodiment of the matrix chip, it comprises:

a first set of N first conductive wires indexed n and a second set of M second conductive wires indexed m that are perpendicular to one another and respectively form N rows and M columns of a matrix, axes Xk indexed k are defined along first diagonals (Dk) of the matrix and axes YI indexed I are defined along second diagonals (D'I) perpendicular to the first diagonals, the matrix chip also comprising first pairs of waveguides along each axis Xk and second pairs of waveguides along each axis YI, each pixel of the matrix forming an elementary chip (Ach(n,m)).

The invention also relates to an ultra-cold atom sensor comprising:

a matrix atom chip according to the invention, an atom source designed to generate a cloud of ultra-cold atoms close to said plane XY of said atom chip;

a generator for generating a homogeneous magnetic field, at least one processor, at least one DC current or voltage generator designed to control electric currents in said conductive wires, and at least one microwave current or voltage generator (GMW) connected to said waveguides, an optical intensity detection system, the sensor being designed to measure, according to requirements and in a reconfigurable manner, at least one acceleration and/or rotational velocity in a direction corresponding to that of the axes Xn or Xk, and/or the axes Ym or YI, and/or a rotational velocity along the axis Z, from said elementary chips.

According to a last aspect, the invention relates to a method for measuring a rotational velocity about at least one axis called measurement axis, using an ultra-cold atom sensor comprising an atom chip, said atom chip being placed in a vacuum chamber and comprising a measurement plane XY defined by an axis X and an axis Y that are orthogonal, said measurement plane being normal to an axis Z, the atom chip comprising:

a plurality of first pairs of waveguides, a first pair consisting of a first and a second waveguide that are coplanar, parallel to one another and arranged symmetrically on either side of an axis whose projection in the plane XY is along the axis X, called pairs of guides along X, a plurality of second pairs of waveguides, a second pair consisting of a first and a second waveguide that are coplanar, parallel to one another and arranged symmetrically on either side of an axis whose projection in the plane XY is along an axis Y' different from the axis X, called pairs of guides along Y', the pairs of guides along X being electrically insulated from the pairs of guides along Y';

the projections in the plane XY of the first pair furthest from X and of the second pair furthest from Y' forming, at their intersection, a parallelogram with a centre O, a first conductive wire having a projection in the plane XY along X or Y' or a diagonal of said parallelogram, the first conductive wire being designed to be flowed through by a DC current, said first wire having a flaring so as to take the form of a surface whose projection in the plane XY incorporates said parallelogram and exhibits symmetry about the point O.

the method comprising the steps of:

A Generating a cloud of said ultra-cold atoms, including phases of dispersing said atoms, of cooling said atoms, of initializing said atoms in at least one internal state |a> and of trapping a cloud of said ultra-cold atoms in a local potential minimum, B Initializing the internal states by coherently superposing said ultra-cold atoms between said state |a> and an internal state |b> different from |a> through a first pulse $\pi/2$;

C Spatially separating a cloud of said atoms with said internal state |a> in a trap from a cloud of said atoms with said internal state |b> in another trap, and moving said traps in opposing directions along a closed path contained within a plane perpendicular to the measurement axis and initialized from the point O:

by applying a predetermined microwave-frequency current or voltage to said waveguides in a predetermined sequence, and by applying a constant DC current or voltage value to the first and where appropriate the second conductive wires, D Recombining said internal states |a> and |b> by applying a second pulse $\pi/2$ to said ultra-cold atoms and then measuring the density of atoms in an internal state chosen from among at least |a> and |b>;

E Determining the Sagnac phase of said ultra-cold atoms and calculating the rotational velocity of said sensor along said measurement axis.

According to one embodiment, in order to measure a rotational velocity about the axis Z, during step C, said sequence includes applying, at certain times, a microwave signal formed by the superposition of a microwave signal at an angular frequency ωa and a microwave signal with an angular frequency ωb to at least one of the guides along X of at least the first pair closest to the axis X, or applying a microwave signal formed by the superposition of a microwave signal at an angular frequency ωa' and a microwave signal with an angular frequency ωb' to at least one of the guides along Y' of at least the second pair closest to the axis Y'.

According to one embodiment, in order to measure a rotational velocity about the axis X or the axis Y', during step C, said sequence includes:

in order to measure the rotational velocity about the axis X, applying, at certain times, a microwave signal formed by the superposition of a microwave signal at an angular frequency ωa and a microwave signal with an angular frequency ωb, simultaneously to the two guides along X of the first pair closest to the axis X, in order to measure the rotational velocity about the axis Y', applying, at certain times, a microwave signal formed by the superposition of a microwave signal at an angular frequency ωa' and a microwave signal with an angular frequency ωb', simultaneously to the two guides along Y' of the second pair closest to the axis Y'.

According to one embodiment, the atom chip furthermore comprising a first and a loading wire that are conductive and electrically insulated from the first wire and where appropriate from the second conductive wire, whose projections in the XY plane are secant at O, in step A, the cloud of ultra-cold atoms is trapped close to the atom chip with said loading wires.

The following description gives a number of exemplary embodiments of the device of the invention: these examples do not limit the scope of the invention. These exemplary embodiments not only have features that are essential to the invention but also additional features specific to the embodiments in question.

BRIEF DESCRIPTION OF THE DRAWINGS

The invention will be better understood and other features, aims and advantages thereof will become apparent from the detailed description which follows and with reference to the appended drawings, which are given by way of non-limiting example and in which.

DETAILED DESCRIPTION

Figure 4A:
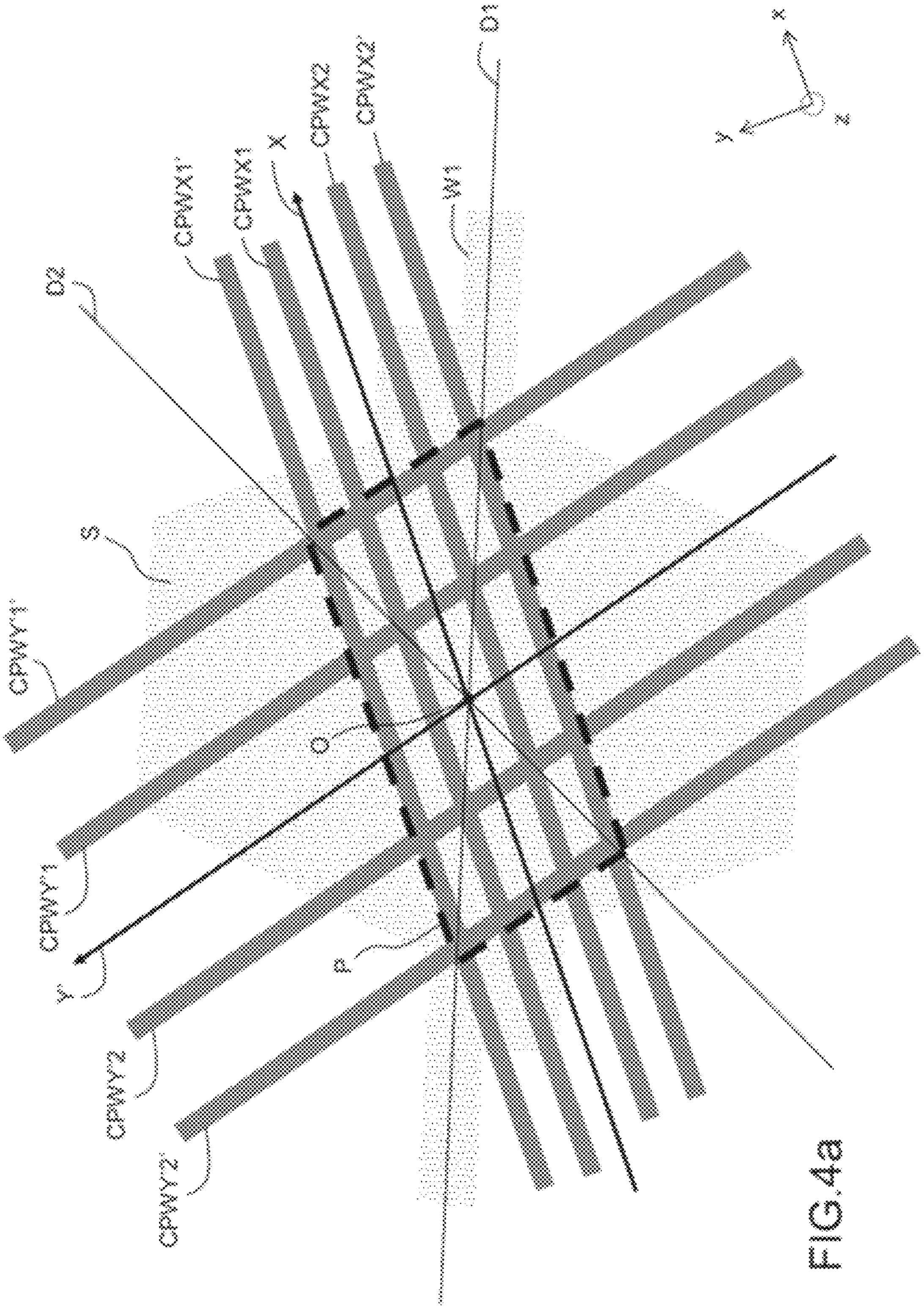
FIG. 4*a* illustrates an atom chip Ach for an ultra-cold atom sensor according to the invention with a wire W1 along the diagonal D1.
Figure 4B:
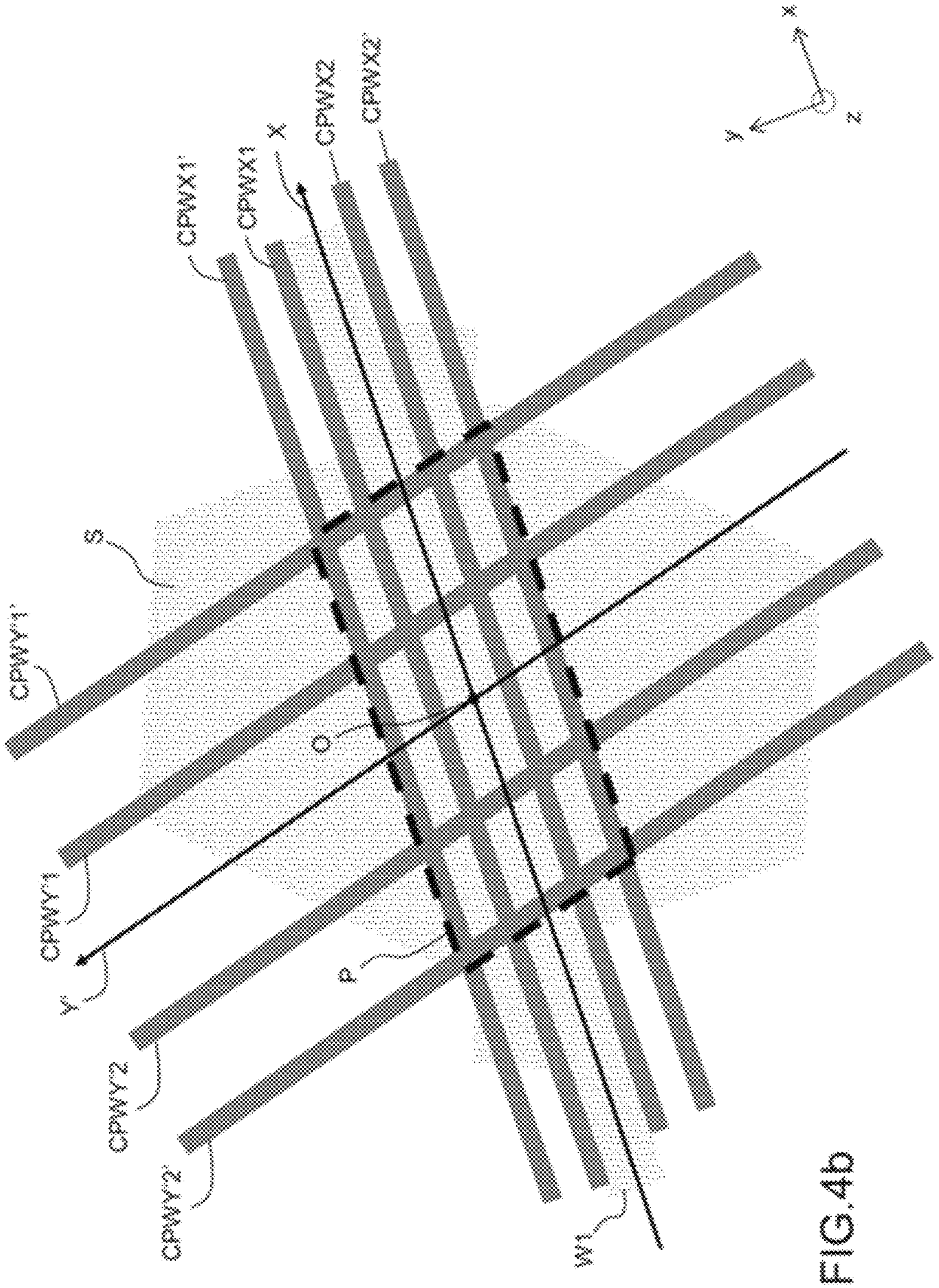
FIG. 4*b* illustrates an atom chip Ach for an ultra-cold atom sensor according to the invention with a wire W1 along the axis X.

According to a first aspect, the invention relates to an atom chip Ach for an ultra-cold atom sensor as illustrated in FIGS. 4*a* and 4*b*. The surface of the chip defines a plane XY called measurement plane defined by an axis X and an axis Y that are perpendicular to one another, the plane XY being normal to an axis Z. The axes XYZ define an orthonormal reference system.

The atom chip Ach comprises a plurality of first pairs of waveguides, a first pair consisting of a first waveguide CPWX1, CPWX1' and a second waveguide CPWX2, CPWX2' that are coplanar, parallel to one another and arranged symmetrically on either side of an axis whose projection in the plane XY is along the axis X, called pairs of guides along X. In FIGS. 4*a* and 4*b*, the pair of guides closest to X is (CPWX1, CPWX2) and the following pair is (CPWX1', CPWX2').

The atom chip also comprises a plurality of second pairs of waveguides, a second pair consisting of a first waveguide CPWY'1, CPWY'1' and a second waveguide CPWY'2, CPWY'2' that are coplanar, parallel to one another and arranged symmetrically on either side of an axis whose projection in the plane XY is along an axis Y' different from the axis X, called pairs of guides along Y'. In FIGS. 4*a* and 4*b*, the pair of guides closest to Y' is (CPWY'1, CPWY'2) and the following pair is (CPWY'1', CPWY'2').

The guides along X are electrically insulated from the guides along Y'. They are preferably arranged on a different level of the chip. In the non-limiting hypothesis in which the guides along X occupy the level corresponding to the measurement plane XY, the projection of the axis X in the plane XY corresponds to this axis X, while the axis of symmetry of the two waveguides CPWY'1 and CPWY'2 is located in the plane of another level. It is thus actually the projection of this axis of symmetry in the plane XY, called Y', which is situated in the plane XY. The axis Y' is different from X, the angle between X and Y' is greater than or equal to 30° and less than or equal to 150°. The projections in the plane XY of the first pair furthest from X and of the second pair furthest from Y' form, at their intersection, a parallelogram P with a centre O.

The chip also comprises a first conductive wire W1 having a projection in the plane XY along X or Y' or along a diagonal D1 or D2 of the parallelogram P.

FIG. 4*a* illustrates the example of a wire W1 along D1 and FIG. 4*b* illustrates the example of a wire along X. The first wire W1 has a flaring so as to take the form of a surface S whose projection in the plane XY incorporates the parallelogram P and exhibits symmetry about the point O. Incorporate is understood to mean that the surface of the parallelogram P is contained within the surface S. Symmetry with a centre O signifies that the angle of the symmetry is 180°. The symmetry of the surface S about O is dictated by symmetry considerations for generating potential minima for the atom traps. Specifically, the dressed traps T1 and T2 have to be symmetrical about the axes X and Y'.

The first conductive wire is designed to be flowed through by a DC current. The wire W1 has a non-constant cross section in the region close to the centre of the trap O, and the surface S is likened to a plane called DC "plane", since the wire W1 is flowed through by a DC current during the measurement performed by the sensor. The surface S incorporates the parallelogram P such that the DC plane covers the entire movement surface of the clouds of atoms during the measurement. The advantages of this geometry are explained further below.

The wire W1 is electrically insulated from the waveguides and preferably occupies a different level of the chip, preferably a level lower than the levels occupied by the guides along X and along Y'. The various levels form a stack arranged on a substrate. The atom chip according to the invention thus comprises a substrate and the stack. According to a first example, the guides and the wire are successively deposited on the substrate and separated by insulating layers if need be. According to a second example, the substrate is etched, one of the elements is inserted, and then a material identical to that of the substrate is deposited and then etched, and so on. In this last case, the various elements are therefore integrated into one and the same material.

For greater clarity in the upcoming figures, the guides and the wire are shown in the plane XY.

The waveguides and the conductive wire are of a similar nature to those described in document WO2017089489. Typically, the wire and the guides are made of gold or copper, insulated by a layer of material chosen from among AlN, $SiO_2$, $Si_3N_4$, the layers being deposited on a substrate Sub made of AlN or silicon or $SiO_2$ or SiC.

The atom chip Ach according to the invention differs from the chip described in document WO2017089489 firstly through the presence of 8 waveguides (rather than two), through the number of wires (just one on its own) and through the flared shape of this wire close to the centre of the trap.

Figure 5:
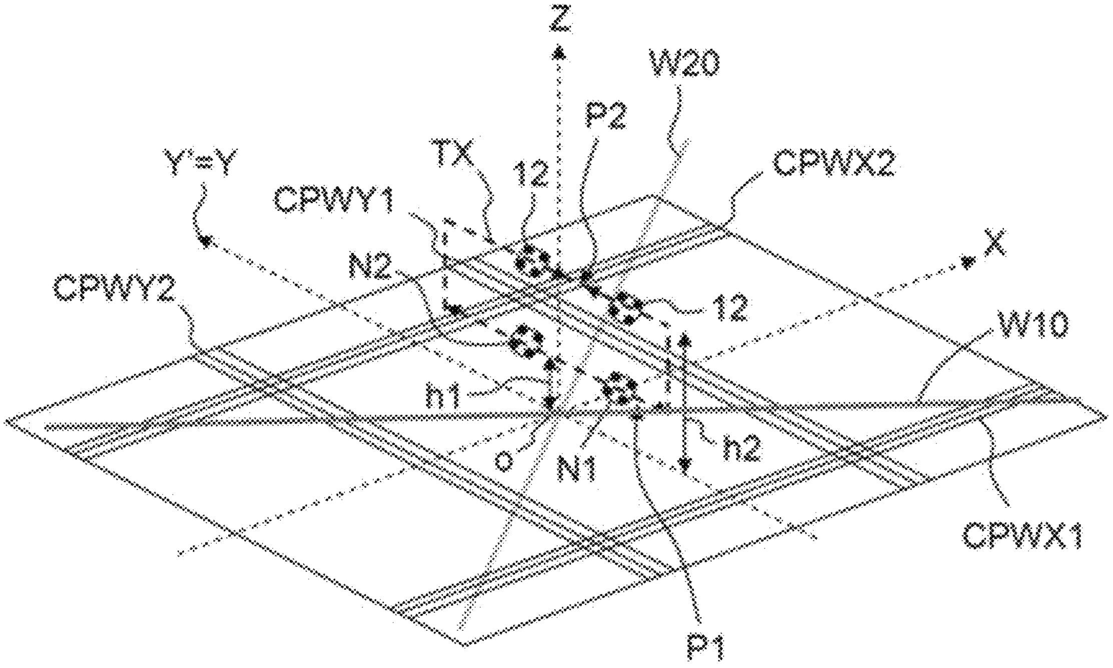
FIG. 5 illustrates the movement path of the two clouds of atoms for a rotational velocity measurement along the axis X, the path being situated in a plane perpendicular to X, according to document FR2004743.
Figure 6:
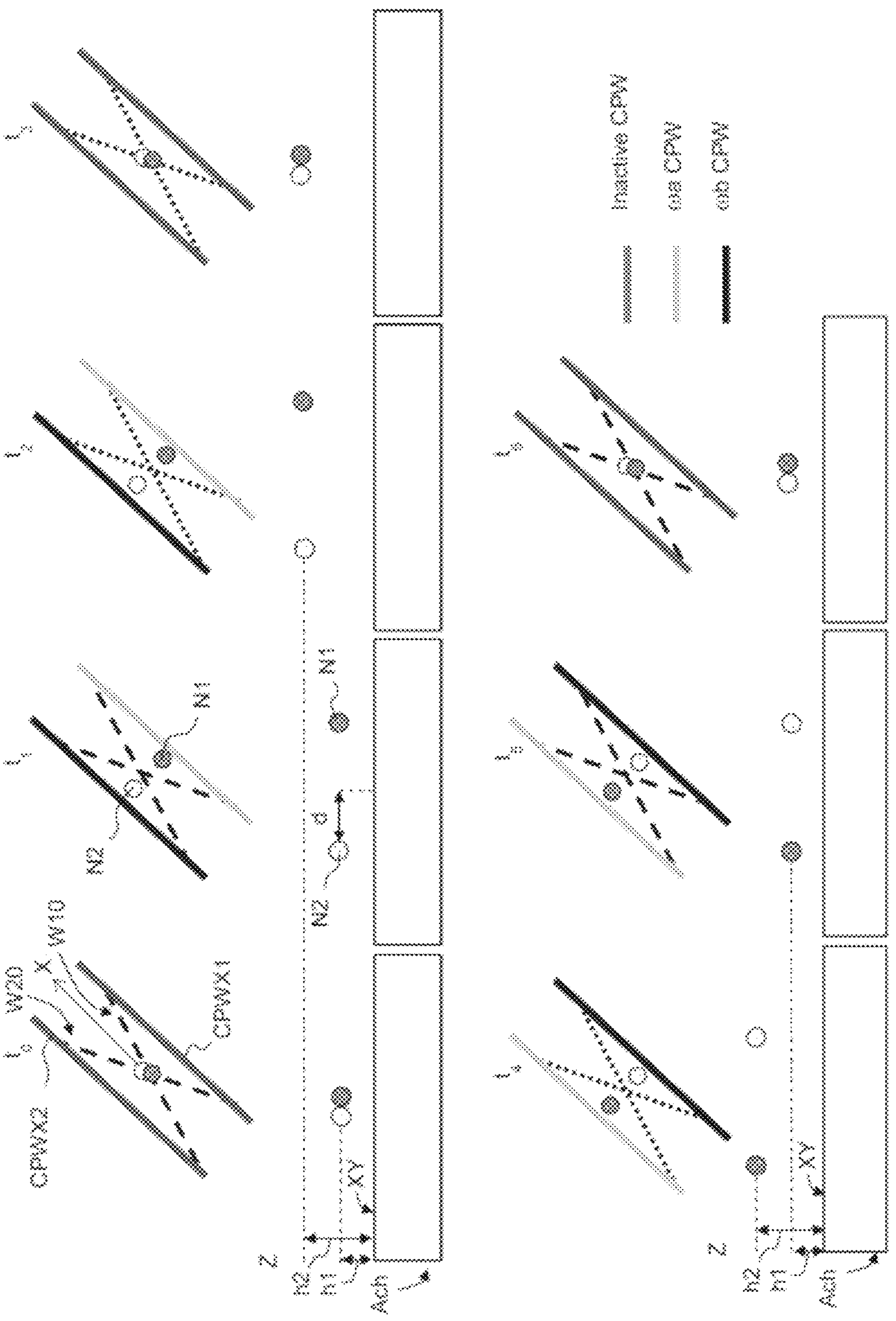
FIG. 6 describes the movement sequence of the clouds of atoms for obtaining the path of FIG. 5.
Figure 7:
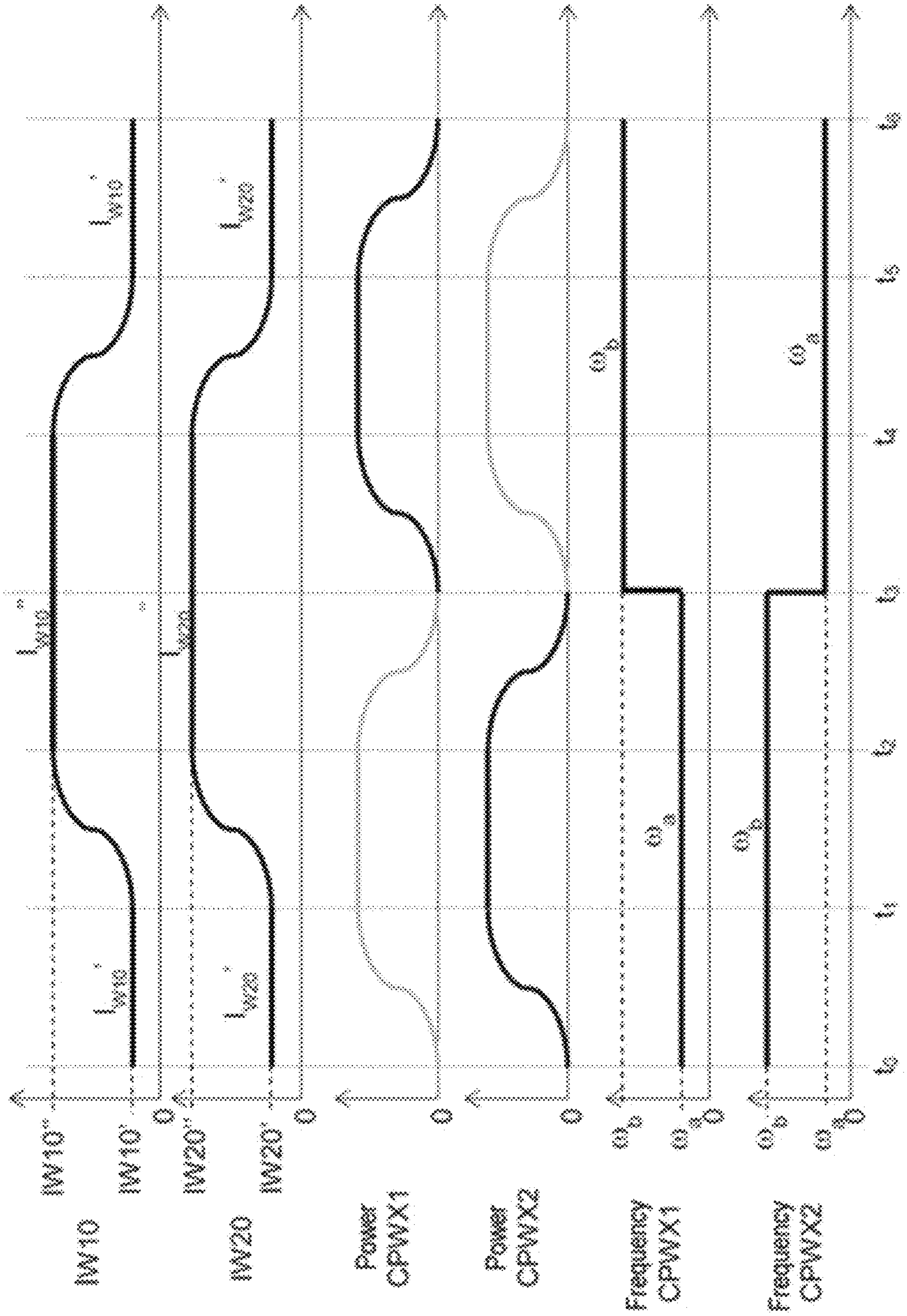
FIG. 7 illustrates the timing diagram that describes the currents IW10 and IW20 applied respectively to W10 and W20, the powers and the frequencies applied to CPWX1 and CPWX2, as a function of time to obtain the movement from FIG. 6.
Figure 14:
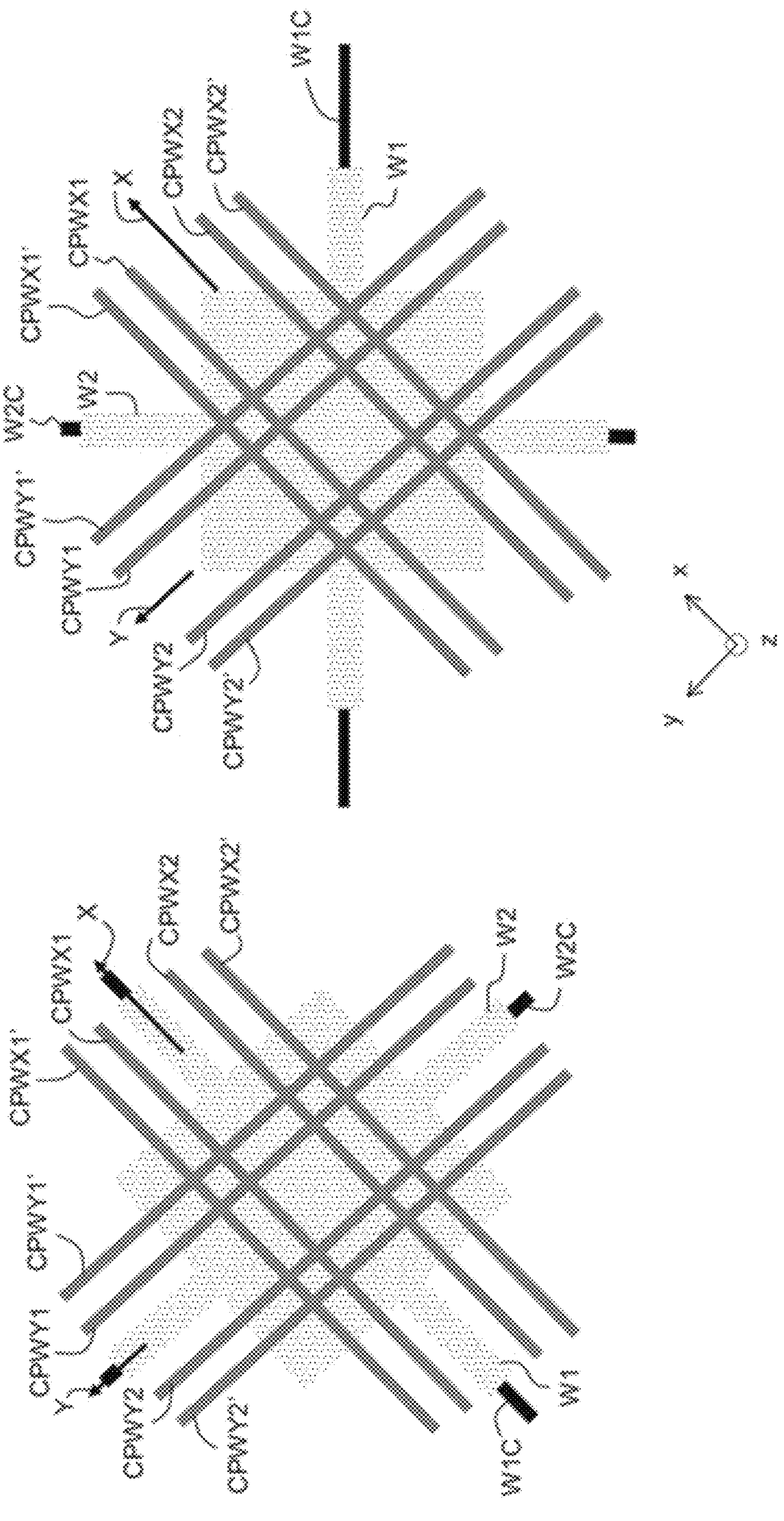
FIG. 14 illustrates one embodiment of the chip according to the invention in which the flared surface S is a square, the left-hand part corresponding to W1/W1C along X and W2/W2C along Y and the right-hand part corresponding to W1/W1C along D1 and W2/W2C along D2.
Figure 15:
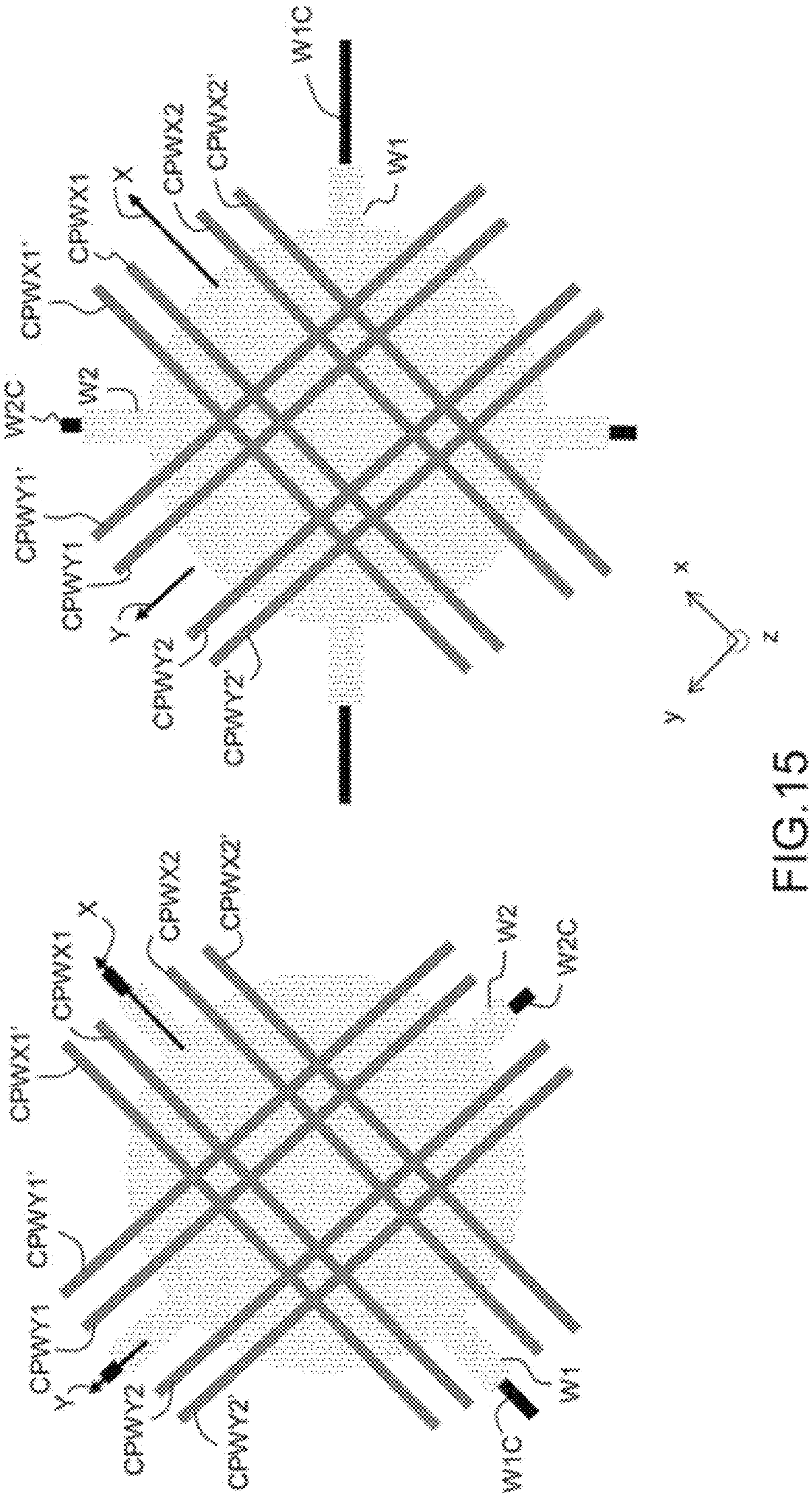
FIG. 15 illustrates one embodiment of the chip according to the invention in which the flared surface S is a circle, the left-hand part corresponding to W1/W1C along X and W2/W2C along Y and the right-hand part corresponding to W1/W1C along D1 and W2/W2C along D2.

In document FR2004743, the geometry with two conductive wires, when the chip is integrated into an inertial sensor, makes it possible to produce two closed paths TX and TY' intended to be travelled by the two clouds N1 and N2 of cold atoms 12, these paths being contained not in a plane parallel to the plane XY as in document WO2017089489, but in two planes that are perpendicular to XY or vertical: the plane YZ perpendicular to X for TX, as illustrated in FIG. 5, and the plane XZ perpendicular to Y' for TY'. FIG. 6 describes the movement sequence of the clouds of atoms for obtaining the path TX. A light grey shade of the guide corresponds to the application of an angular frequency ωa to this guide, and a dark grey shade corresponds to the application of an angular frequency ωb, the intermediate grey shade corresponding to an inactive guide to which no signal is applied. Lines in long dashes signify that low levels of DC current are applied to the wires W10 and W20, respectively Iw10' and Iw20', while dot-and-dash lines signify that high levels of DC current are applied to W10 and W20, respectively Iw10" and Iw20". The two clouds are separated by applying ωa to CPWX1 and ωb to CPWX2, while the height is changed, from h1 to h2, by changing from the low current level to the high current level in the conductive wires. This is illustrated on the timing diagram of FIG. 7, which describes the currents IW10 and IW20 applied respectively to W10 and W20, the powers and the frequencies applied to CPWX1 and CPWX2, as a function of time. Thus, in document FR2004743, the switch from h1 to h2 in order to create the "vertical" paths TX and TY' is implemented by applying two-level DC signals to the two wires. In that document, the measurement along Z with the "horizontal" path (in the plane XY) is performed with a plurality of conductive wires, by moving the clouds by moving the magnetic field minimum, obtained by successively activating various points of intersection between the wires, as illustrated in FIGS. 14 and 15 of that document.

The inventors have developed an addressing method allowing the clouds of atoms 12 to describe, in the opposite direction, a horizontal path (parallel to the plane XY), called first path TZ, without requiring additional wires. With the chip according to the invention integrated into an inertial sensor, a horizontal path is obtained with only one conductive wire, and by applying specific microwave signals in an interferometry time sequence, the conductive wire itself being kept at a constant current. In order to create the path TZ, an interferometry sequence is implemented, including applying, to one of the waveguides, a microwave signal comprising the superposition of a signal at a first angular frequency (ωa or ωa') and a signal at a second angular frequency (ωb or ωb'). This signal, proportional to Ea·cos (ωat)+Eb·cos (ωbt) (respectively to Ea'·cos (ωa't)+Eb'·cos (ωb't)) is called sum signal, and denoted signal [a+b] or signal [a'+b'] depending on the angular frequencies forming it (see further below).

For issues of symmetries of the potential applied to obtain the atom traps, some preferred embodiments are described below.

Figure 8A:
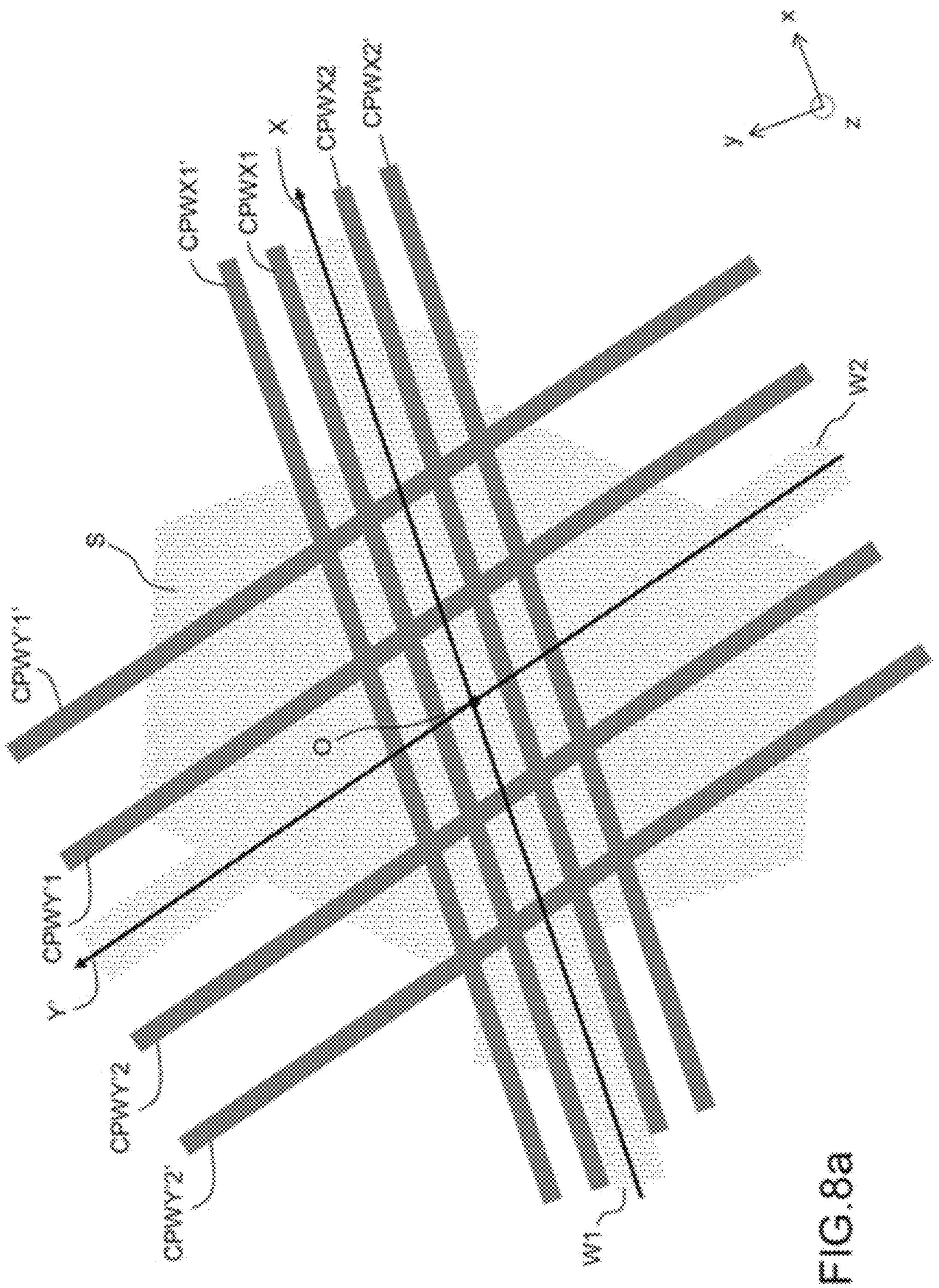
FIG. 8*a* illustrates a first variant of an atom chip according to the invention in which the first and second wires are oriented respectively along X and Y'.
Figure 8B:
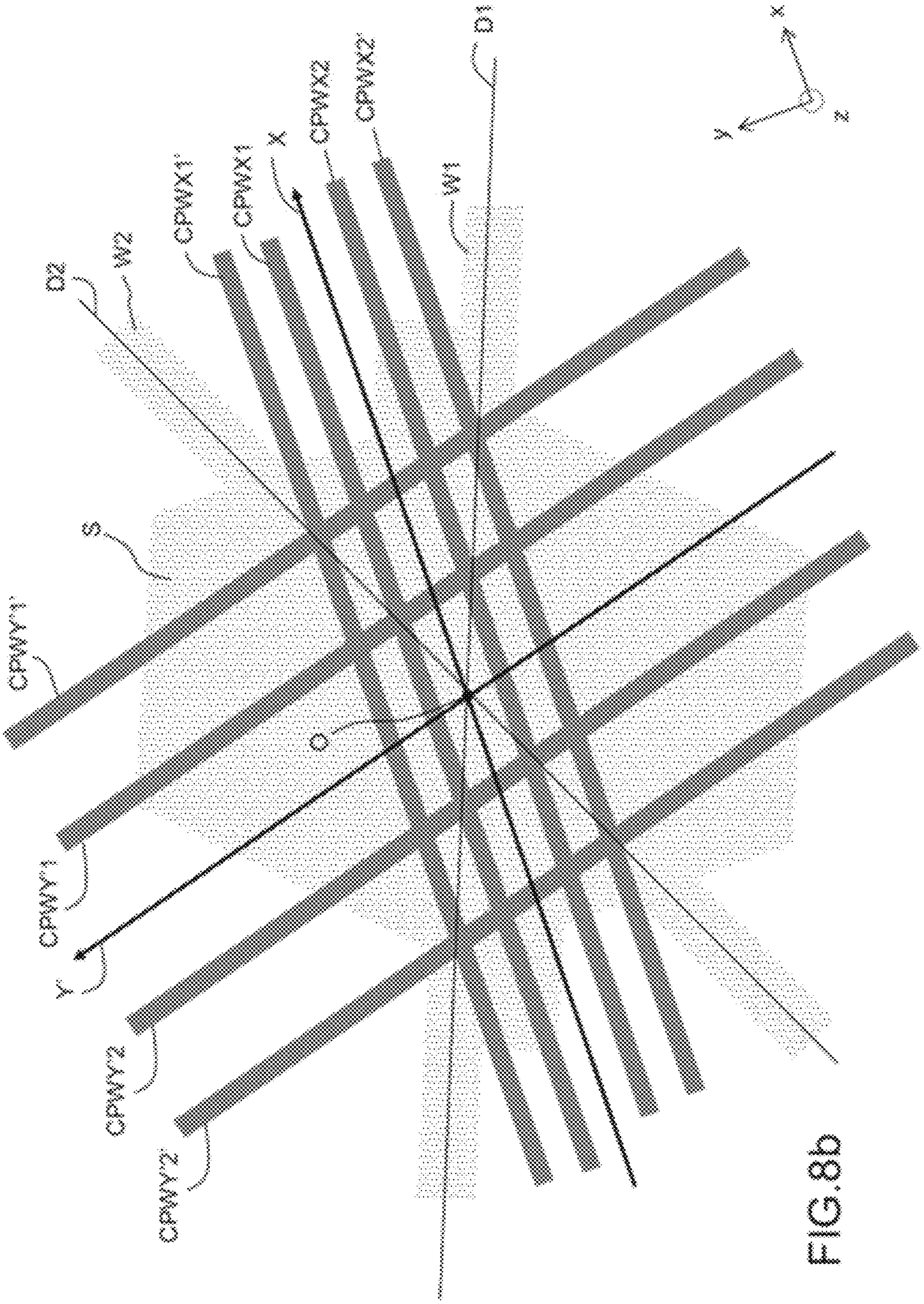
FIG. 8*b* illustrates a second variant of an atom chip according to the invention in which the first and second wires are oriented respectively along the first diagonal D1 and along the second diagonal D2 of the parallelogram P.

According to one embodiment, the atom chip furthermore comprises a second conductive wire W2 coplanar with the first conductive wire W1. According to a first variant, the first and the second wire are oriented respectively along X and Y' or vice versa as illustrated in FIG. 8*a*, and according to a second variant the first and the second wire are oriented respectively along the first diagonal D1 and along the second diagonal D2 of the parallelogram P or vice versa, as illustrated in FIG. 8*b*. Of course, in this case, the surface S is the intersection of these two wires W1 and W2. The second wire is of the same type as the first and preferably, in the measurement, one and the same DC current will be applied to the two wires, but this is not obligatory.

Figure 9:
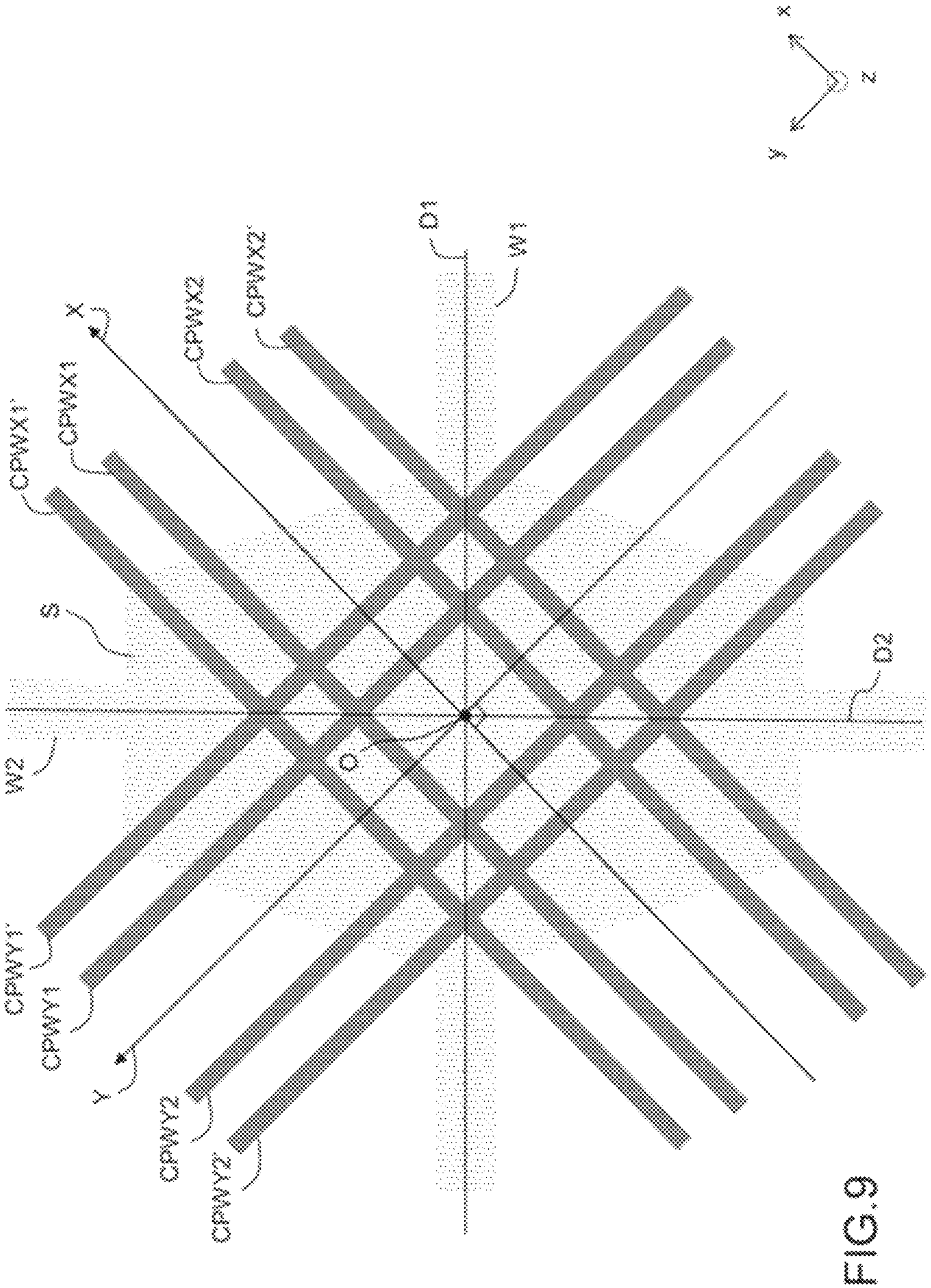
FIG. 9 illustrates one embodiment of the atom chip in which the axis Y' is coincident with the axis Y.

Preferably, in order to measure velocities and accelerations along perpendicular axes, the axis Y' is coincident with the axis Y as illustrated in FIG. 9, for the case W1 and W2 along D1 and D2. The parallelogram P becomes a rectangle or a square here.

Figure 10:
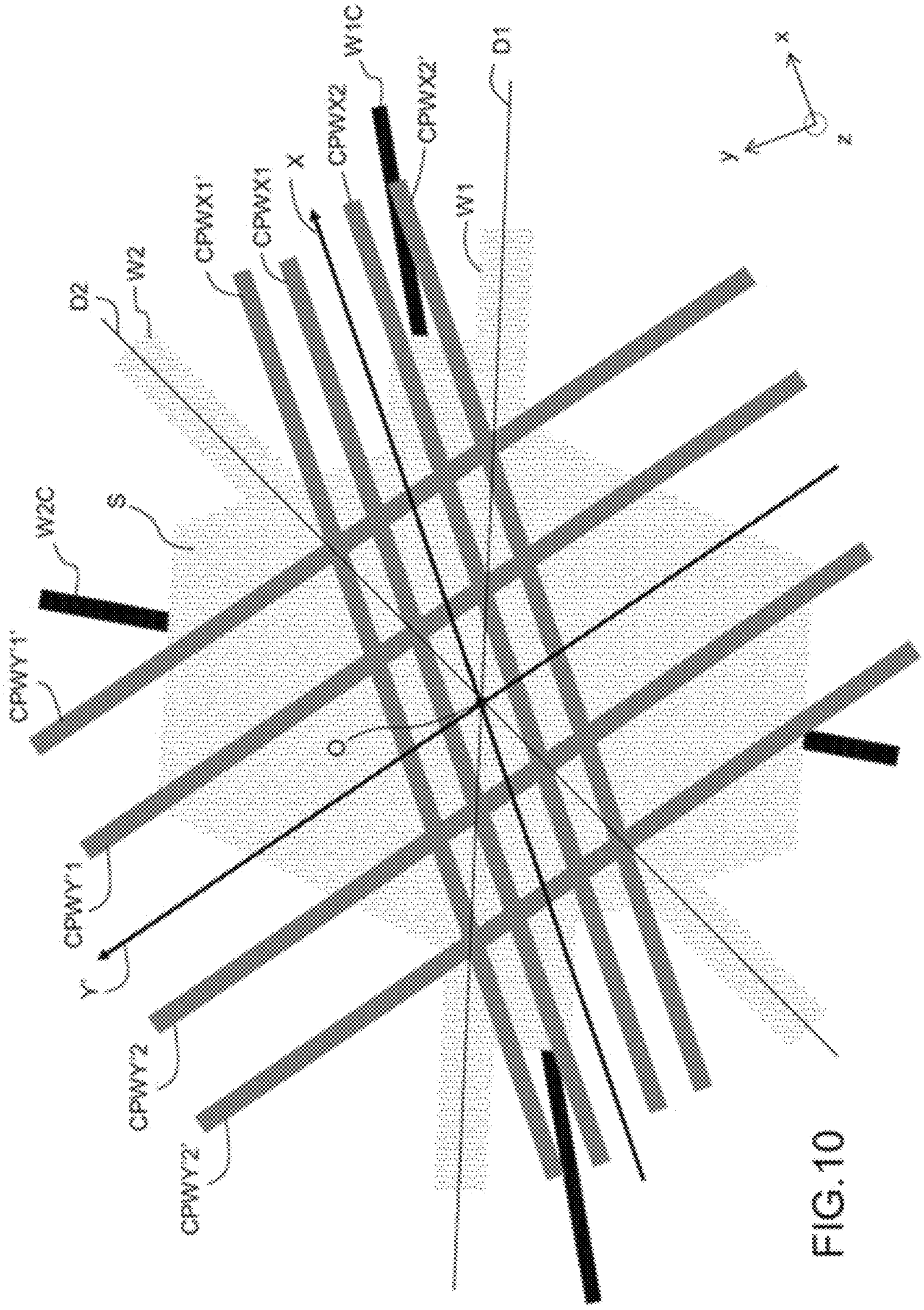
FIG. 10 illustrates one embodiment of the atom chip according to the invention in which the chip also comprises a first conductive wire, called loading wire, and a second conductive loading wire, electrically insulated from the one or more conductive wires W1 and W2.
Figure 11:
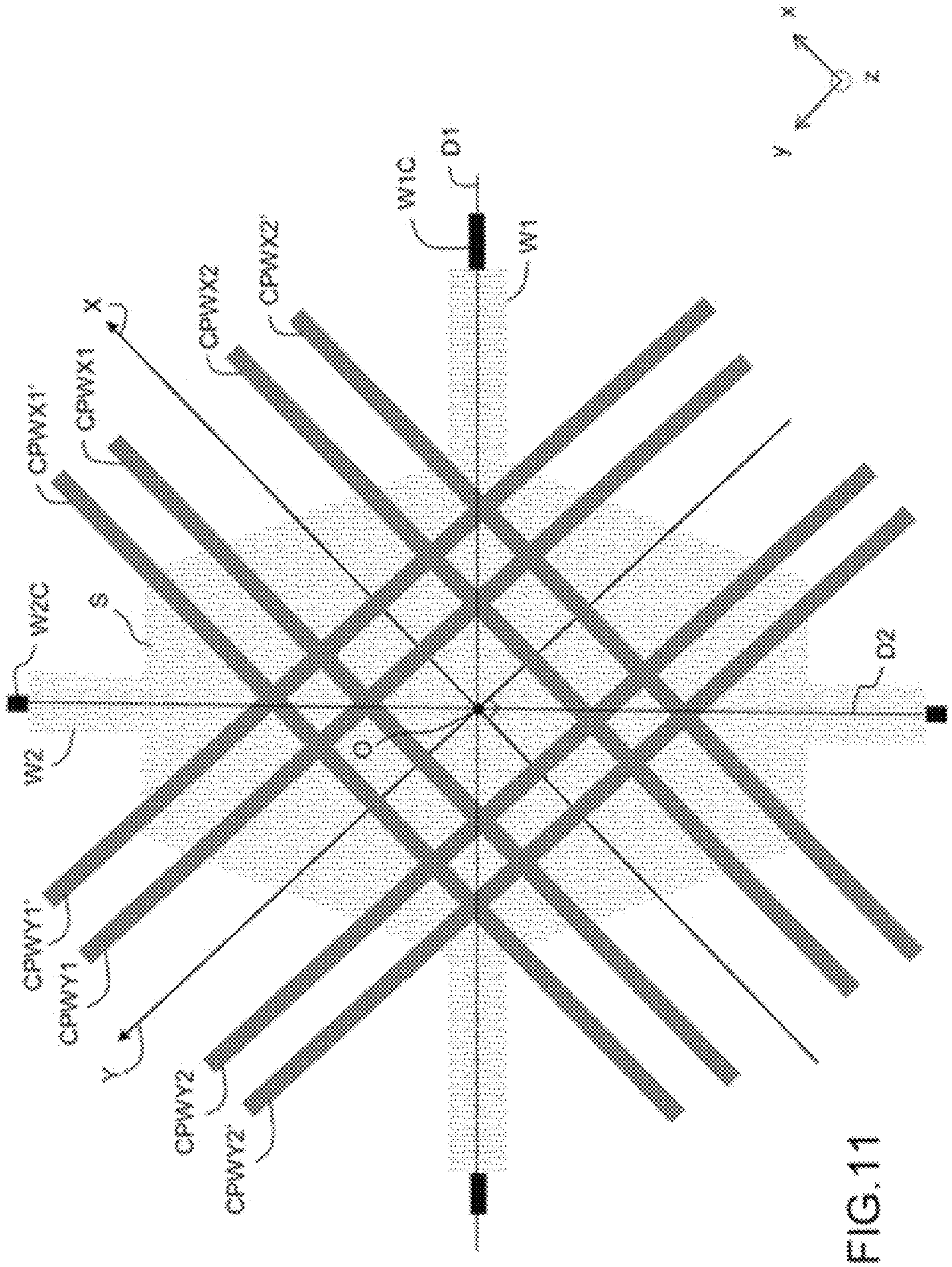
FIG. 11 illustrates one particular embodiment in which the projections of the loading wires coincide with the projections of the conductive wires outside the surface S, for the case W1 and W2 along the two diagonals D1 and D2 of the parallelogram P.
Figure 12:
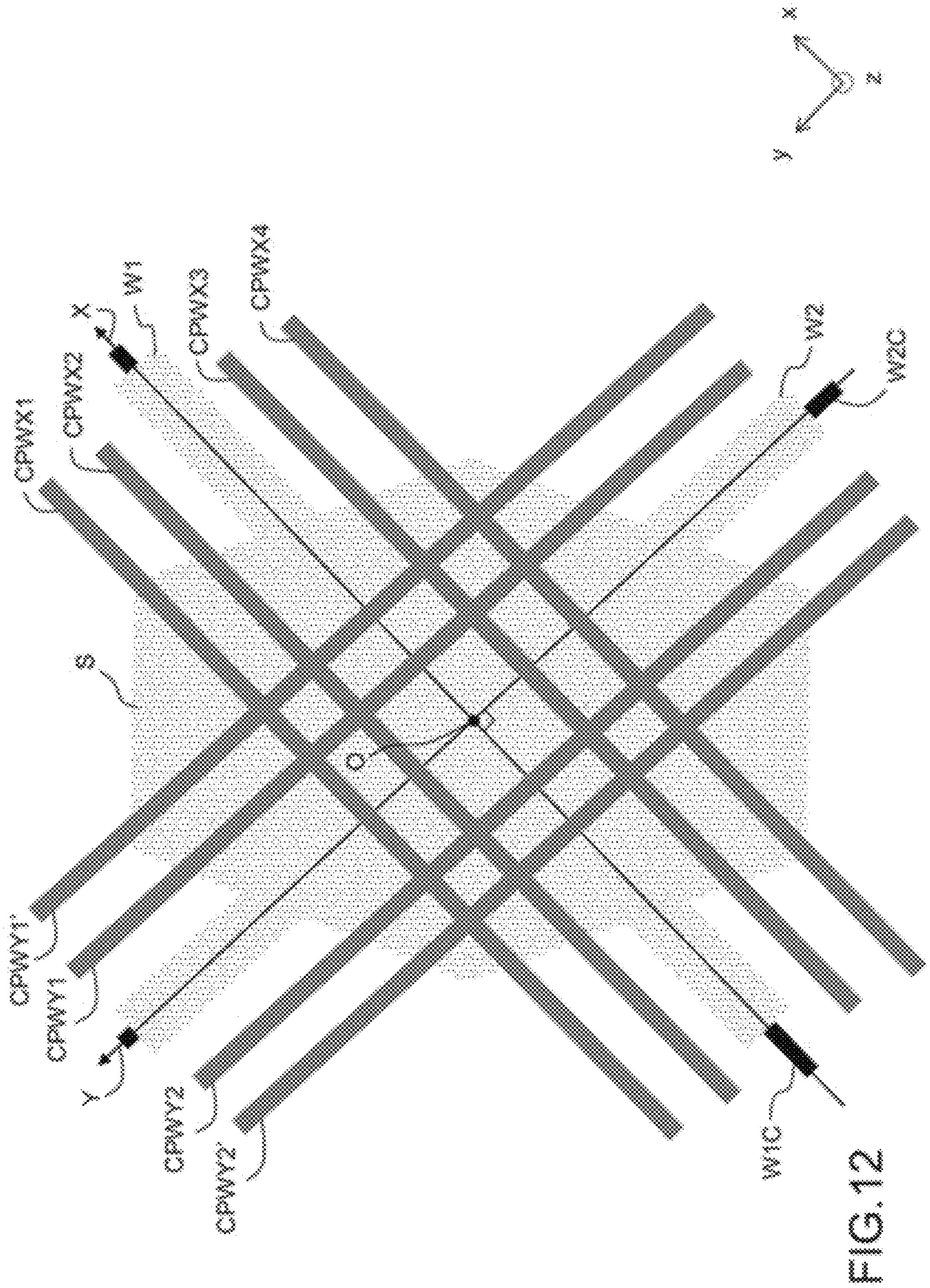
FIG. 12 illustrates one particular embodiment in which the projections of the loading wires coincide with the projections of the conductive wires outside the surface S, for the case W1 along X and W2 along Y (case Y'=Y).

According to one embodiment, the atom chip also comprises a first conductive wire W1C, called loading wire, and a second conductive loading wire W2C, electrically insulated from the one or more conductive wires W1 and W2, and whose projections in the plane XY are secant at O, as illustrated in FIG. 10. Preferably, still for considerations of symmetry and also for ease of manufacture, the projections of the loading wires coincide with the projections of the conductive wires outside the surface S, as illustrated in FIG. 11 for the case W1 and W2 along D1 and D2 and FIG. 12 for the case W1 and W2 along X and Y (case Y'=Y).

The surface S of the one or more wires W1 and W2 forming the DC plane makes it possible to obtain "soft" atom traps, this meaning that the curvature of the trap close to the potential minimum that is generated is low. The advantage is that the atoms are less attracted towards the measurement plane, and this allows microwave separation over a greater distance (see further below). However, this lower attraction may prove insufficient in the preliminary charging step, which transfers the cloud of ultra-cold atoms from the MOT to the vicinity of the chip. The loading wires then make it possible to create a "steep" trap at their intersection, of greater depth (greater curvature, greater attraction) in order to trap the hottest atoms during loading. During loading, these wires W1C and W2C are flowed through by high DC currents and they are therefore preferably arranged on the lower level of the chip (furthest from the measurement plane), allowing better dissipation of heat, enabled by burying. The loading wires are "activated" only during the loading step, and they are then deactivated and do not contribute to the sequence of moving the clouds to perform a measurement.

Figure 13:
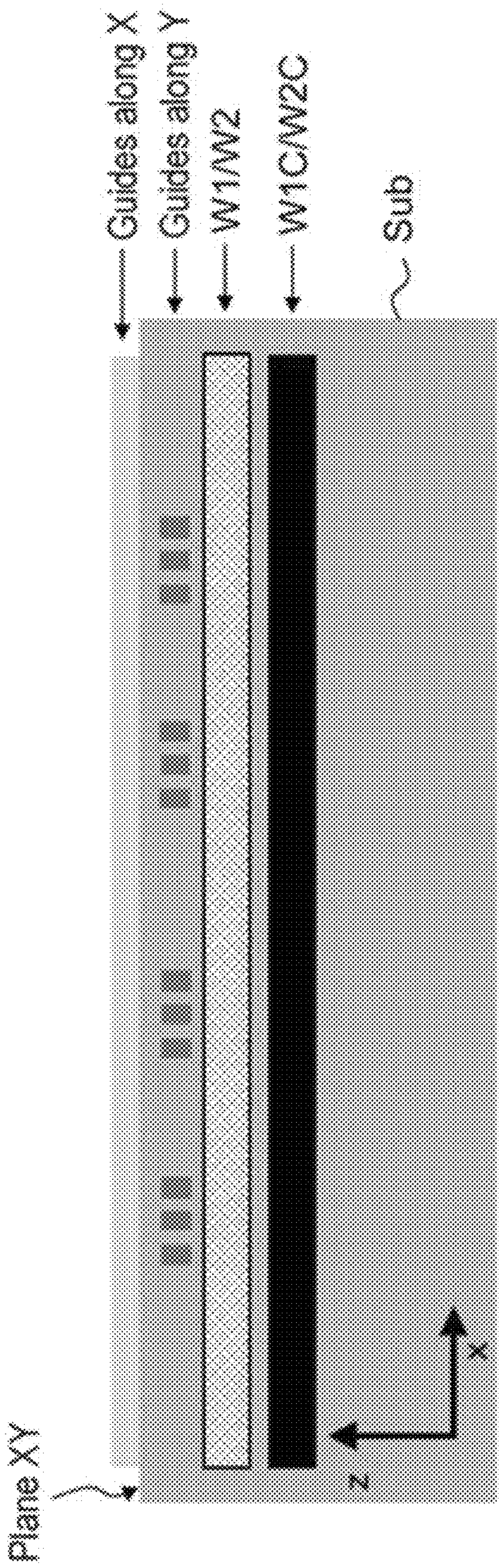
FIG. 13 illustrates a cross section of the atom chip according to one embodiment in which the loading wires W1C and W2C occupy the level of the chip furthest from the measurement plane, the components being buried in one and the same substrate.

As explained above, the guides along X, the guides along Y', the one or more conductive wires W1 and W2 and the loading wires W1C and W2C preferably each occupy a different level of the chip. Preferably, the loading wires W1C and W2C occupy the level of the chip furthest from the measurement plane, as illustrated in FIG. 13, in which the components are buried in one and the same substrate Sub. FIG. 13 corresponds to the cross-sectional view in the plane XZ of the geometry of FIG. 11. The wires W1C and W2C might also not be on the same level.

Hereinafter, various non-limiting exemplary implementations of the atom chip Ach according to the invention in an ultra-cold atom sensor are given with the axis Y' coincident with the axis Y and the wires W1 and W2 along respectively X and Y or D1 and D2, and where applicable the wires W1C and W2C along respectively W1 and W2, but it is understood that these examples are applicable to any type of atom chip according to the invention.

For example, the surface S is chosen from among: an oval, a circle, a polygon, a rectangle, a square. FIG. 14 illustrates the case of a square (on the left W1/W1C along X and W2/W2C along Y and on the right W1/W1C along D1 and W2/W2C along D2) and FIG. 15 illustrates the case of a circle (on the left W1/W1C along X and W2/W2C along Y and on the right W1/W1C along D1 and W2/W2C along D2).

Hereinafter, the convention of the grey shades and lines is: a light grey shade of the guide corresponds to the application of an angular frequency ωa or ωa' to this guide, a dark grey shade corresponds to the application of an angular frequency ωb or ωb', an intermediate grey shade corresponds to an inactive guide to which no signal is applied, and a dashed line corresponds to the application of a sum signal [a+b] or [a'+b'].

The inventors have established that, with a chip Ach according to the invention, once the clouds have been separated by applying different angular frequencies to each of the guides of a pair, it was possible, by applying a sum signal to one of the waveguides of the other pair, to repel the two clouds from the side opposite that of the "activated" guide with the sum signal. While the clouds describe the first path TZ, a current of constant strength is applied to the one or more wires W1 (W2).

Figure 16:
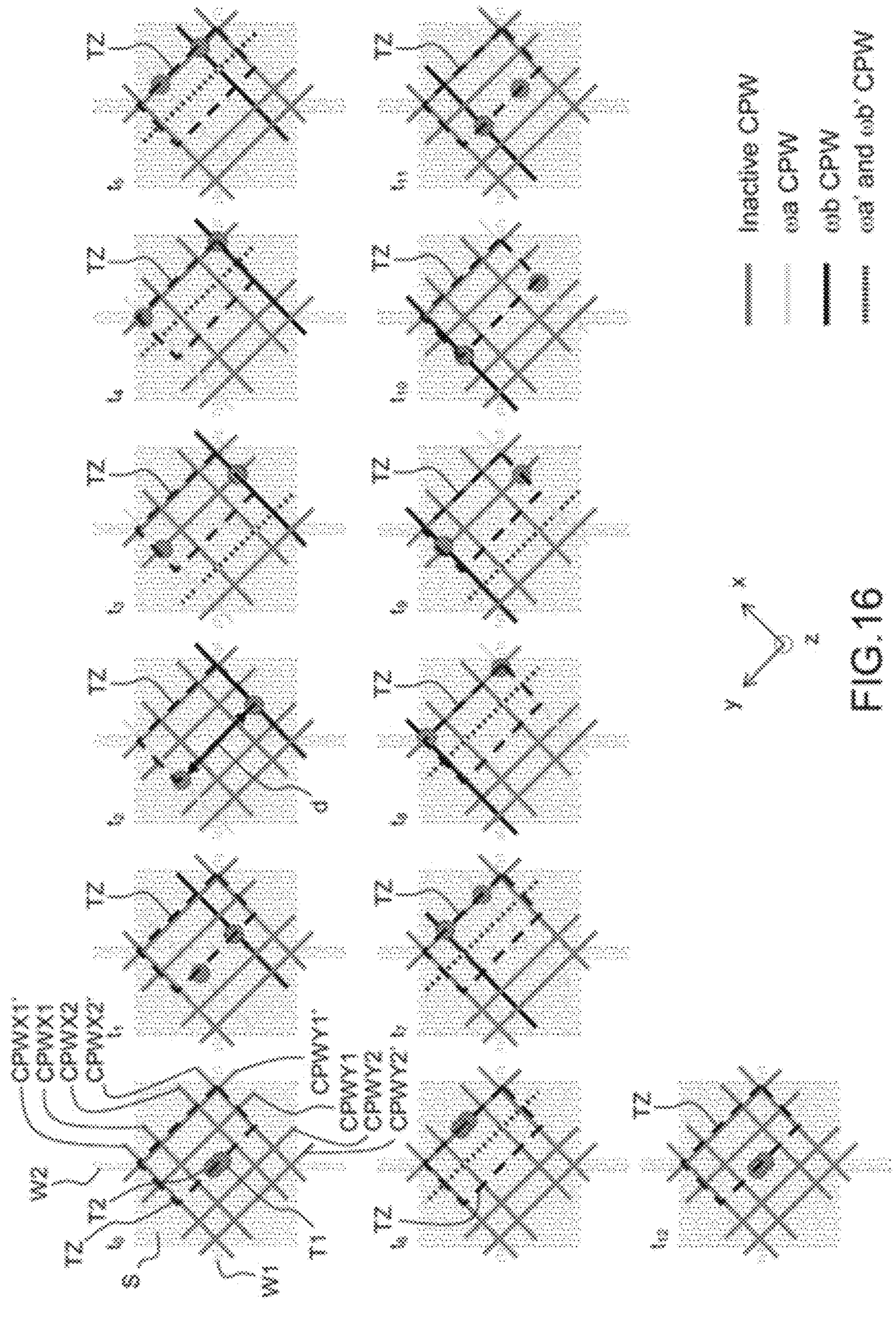
FIG. 16 illustrates a first embodiment of a path TZ through movement of the two trapped clouds, the movement being illustrated at various times t0 to t12 of the addressing time sequence.
Figure 17A:
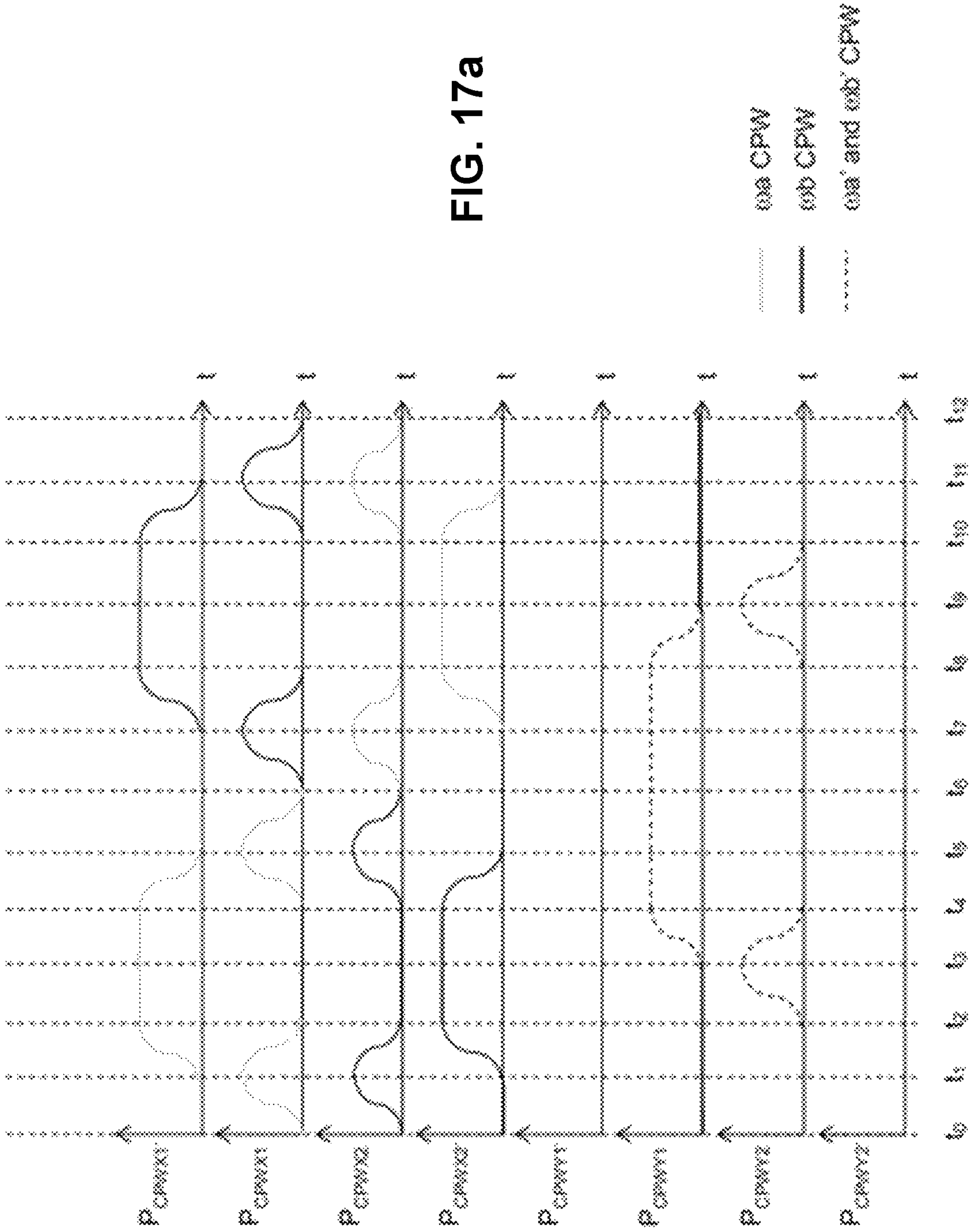
FIG. 17*a* illustrates the signals applied to the waveguides as a function of time.
Figure 17B:
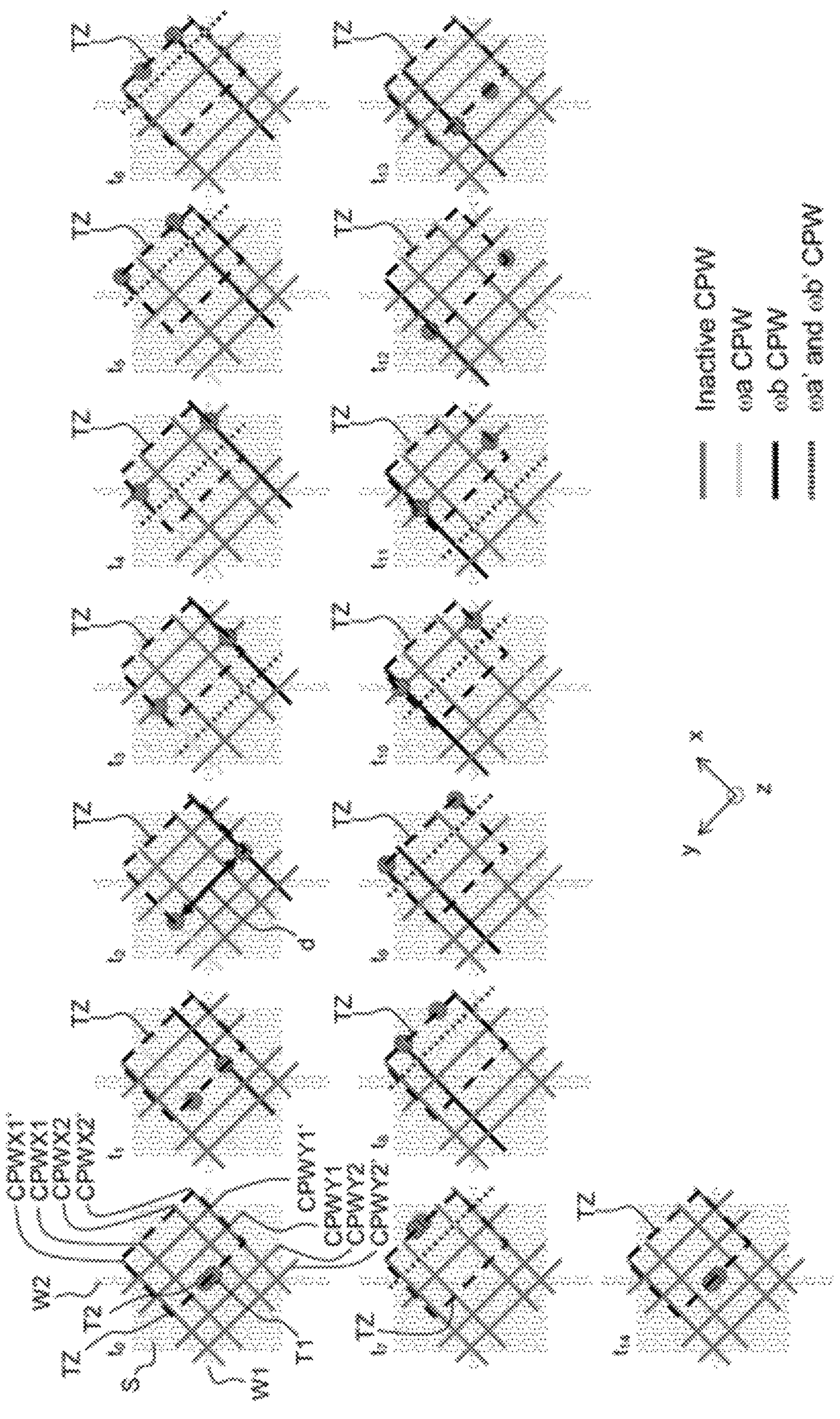
FIG. 17*bi* illustrates one variant embodiment of a path TZ in which the guide CPWY1' is also activated with a sum signal (and therefore simultaneously the power applied to CPWY1 is reduced).

A first example of a first path TZ through movement of the two trapped clouds is illustrated in FIG. 16, the movement being illustrated at various times t0 to t12 of the addressing time sequence. The signals applied to the guides as a function of time are illustrated in FIG. 17*a*. The units on the axes are arbitrary. $P_{CPWX1}$ is the power of the microwave signal applied to CPWX1. In this non-limiting example, the chip has two wires W1 and W2 along the two diagonals P, the flared surface S is square and the axis Y' coincides with the axis Y, but the principle is applicable to all atom chip geometries according to the invention.

Figure 1:
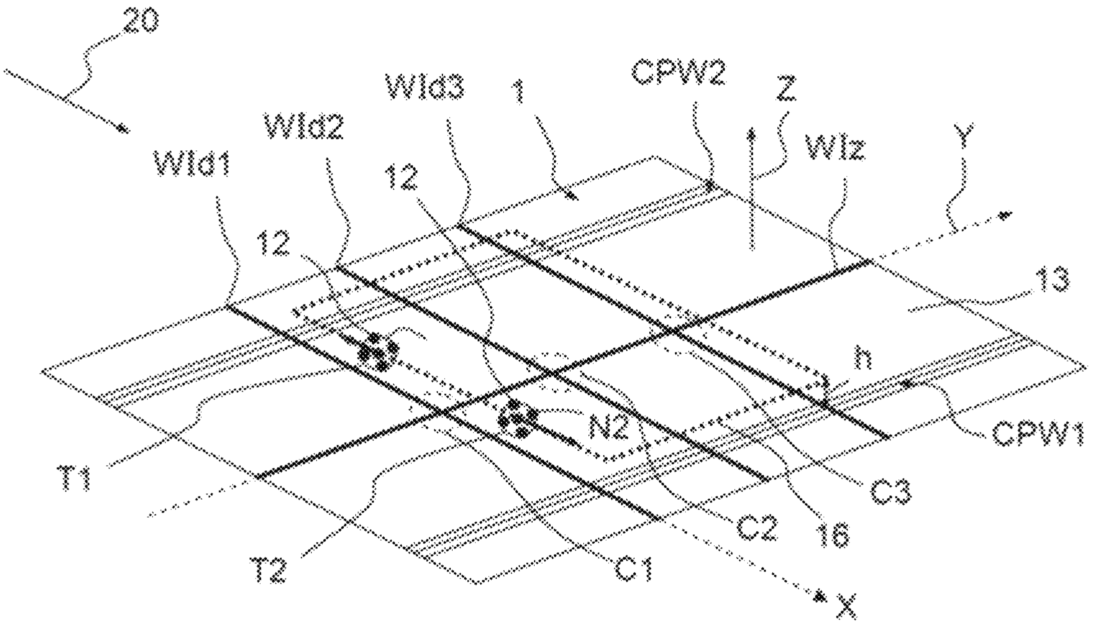
FIG. 1, already cited, illustrates one example of a topology of the conductive wires and the microwave guides and of a path of the two clouds of atoms.
Figure 2:
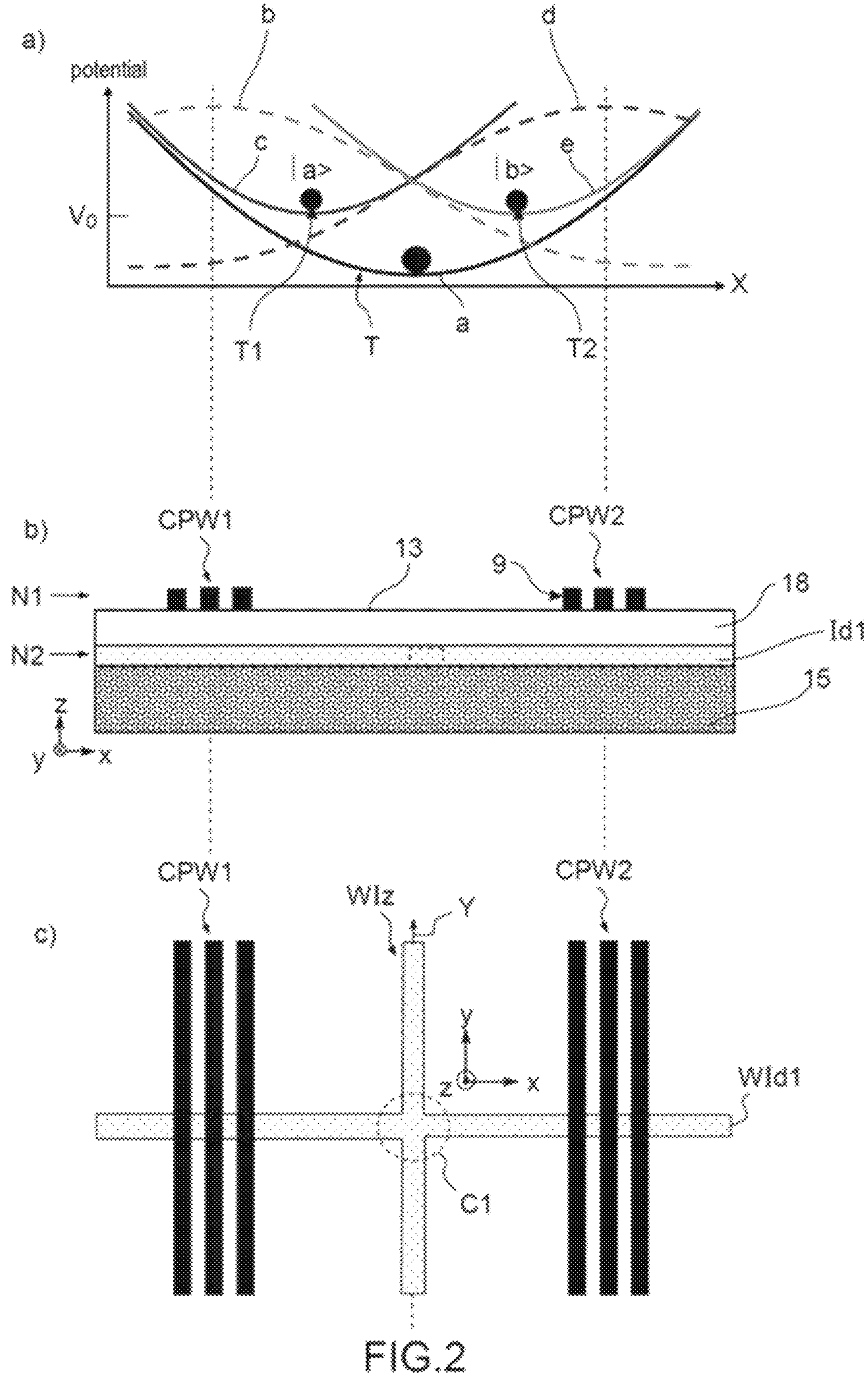
FIG. 2, already cited, illustrates the geometry of the guides and wires of the atom chip as well as the traps T1 and T2.
Figure 3:
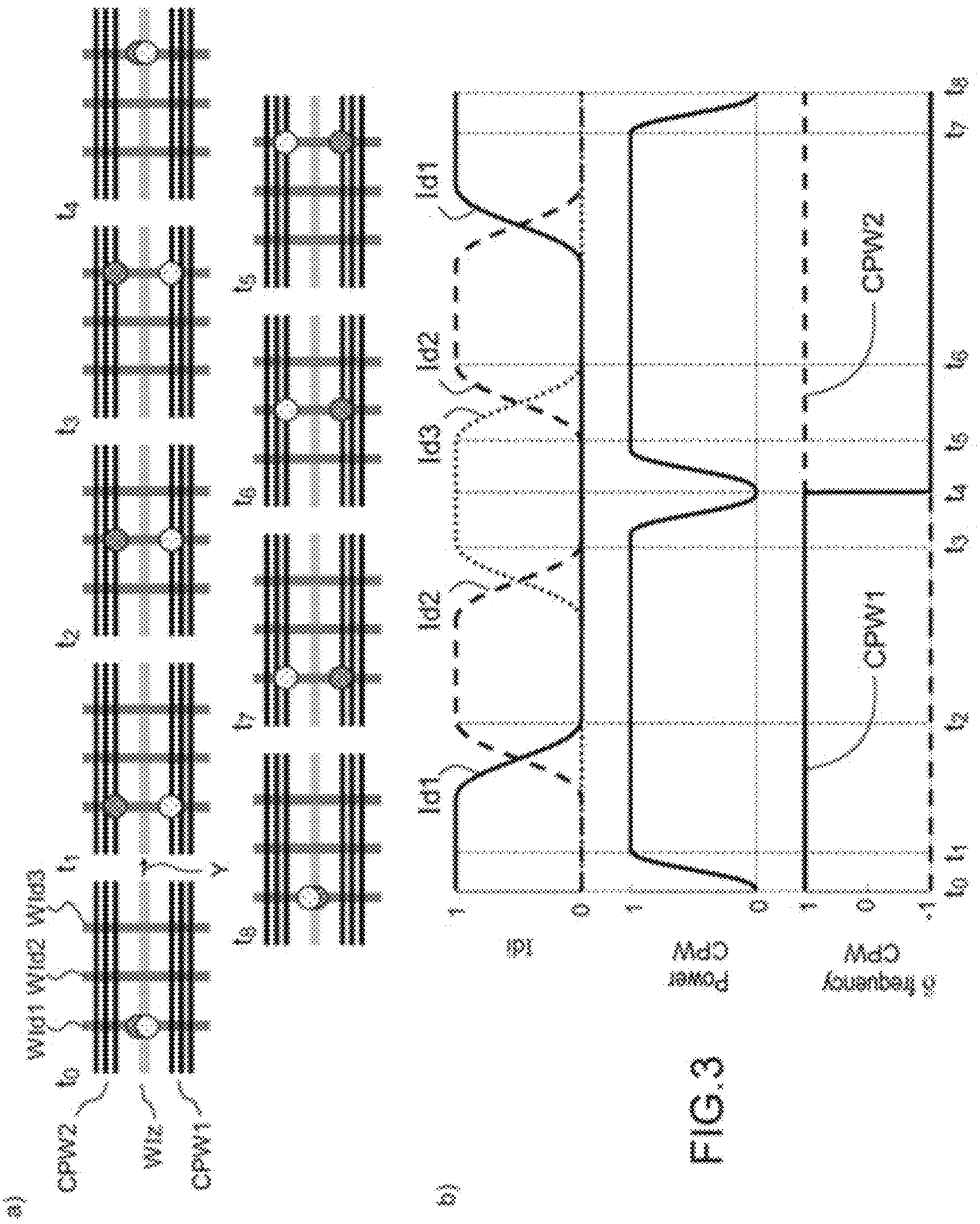
FIG. 3, already cited, illustrates the principle of generating the path of the clouds of atoms on the atom chip.

Just before t0, the internal states are initialized by coherently superposing the ultra-cold atoms between the states |a> and |b> through a first pulse π/2. A DC current $I_{W1}$ is imposed on the conductive wire W1, and a DC current $I_{W2}$, possibly but not necessarily equal to $I_{W1}$, is imposed on the wire W2. The two internal states |a> and |b> are coherently and spatially superimposed plumb to the point O in a trap T (equivalent to step B0 and the time t0 in FIG. 3, or to t0 in FIG. 6).

The phase of free evolution then begins.

Between t0 and t1, the microwave power injected into the waveguides CPWX1 and CPWX2 changes gradually from 0 to its maximum value. An angular frequency $\omega_a$ is sent into the waveguide CPWX1 and an angular frequency $\omega_b$ is sent into the waveguide CPWX2, thereby making it possible to separate the two clouds with different internal states onto either side of the axis of symmetry X to the positions depicted schematically in t1. The ultra-cold atom trap T described above at the time t0 is then transformed into two ultra-cold atom traps T1 and T2, each trap making it possible to immobilize a cloud of ultra-cold atoms with internal states different from the other trap (in this case with an internal state |a> in one of the traps, for example T1, and with an internal state |b> in the other trap T2). It will be recalled that a frequency ωa (or ωa') applied to a waveguide "pushes" the trapped atoms in the state |a> (T1) from the side opposite this waveguide, and that a frequency ωb (or ωb') applied to a waveguide "pushes" the trapped atoms in the state |b> (T2) from the side opposite this waveguide. Each cloud is illustrated by a different texture, T1 in stripes and T2 in dots. This is the equivalent of the time t1 in FIG. 3 and in FIG. 6.

Between t1 and t2, according to one variant, the microwave power applied to CPWX1 and CPWX2 decreases to 0 while the microwave power applied to CPWX1' and CPWX2' increases from 0 to its maximum value. The traps T1 and T2 are repelled further from the axis X, thereby making it possible to increase the area contained within the path TZ and therefore the sensitivity of the sensor.

Between t2 and t3, the microwave power of the guide CPWY2 changes gradually from 0 to its maximum value by applying a sum microwave signal formed by the superposition of a microwave signal at an angular frequency ωa' and a microwave signal with an angular frequency ωb'. The angular frequencies ωa' and ωb' are a priori different from ωa and ωb, but according to one particular case may be equal (ωa'=ω, ωb'=ωb). Generally speaking, the pairs (ωa, ωb) and (ωa', ωb') are chosen based on the material used for the atoms. For the case of rubidium 87, they are linked to Zeeman transitions (see abovementioned publication by Ammar et al). The reward serves only to distinguish between what is applied to the guides along X and the guides along Y, but the two pairs are interchangeable.

The effect of this "sum" microwave power is that of repelling the two clouds from the side opposite the one where the guide CPWY2 is located, the two clouds still being kept separate by a distance d along X by applying the signals to CPWX1' and CPWX2'. The component at ωa in the guide CPWY2 makes it possible to push the state |a> from the side opposite CPWY2, that is to say towards CPWY1 and the component at ωb in the guide CPWY2 makes it possible to push the state |b> from the side opposite CPWY2, that is to say towards CPWY1. Applying a signal that superposes the two frequencies, here for example to CPWY2, repels the two clouds in the same direction with the same guide. The two traps are repelled to the right of the axis Y (not shown). "Pushing force" is the name given to the force that makes it possible to push the clouds of atoms by activating microwave guides.

The surface S of the wires W1 and W2 creates a trap called DC magnetic trap, and this trap exerts a return force on the atoms. This return force opposes the pushing force. With a fixed current in W1 and W2, for traps situated at distances (along the Z) close to the wires, this return force decreases when the width of the wire, that is to say here the surface S, is increased. Therefore, in order to best take advantage of this force that pushes the clouds, it is necessary to reduce the return force of the DC magnetic trap.

This is all the more true as, in the invention, only microwave fields are used to "push" the atoms. The inventors have shown that the return force is sufficiently reduced to generate closed paths for the clouds when the surface S incorporates the parallelogram P.

To obtain a greater area covered by the path TZ, according to one variant, from t3 to t4, the power applied to CPWY2 decreases to 0 while the power applied to CPWY1 increases from 0 to its maximum value. The traps T1 and T2 are repelled even further from the axis Y.

Between t4 and t5, the sum power applied to CPWY2 is maintained so as to continue to repel the atoms from Y. The power applied to CPWX1' and CPWX2' decreases to 0 while the power applied to CPWX1 and CPWX2 increases, so as to bring the clouds of atoms closer to the axis X.

From t5 to t6, the sum power applied to CPWY2 is maintained so as to continue to repel the atoms from Y. The power applied to CPWX1 and CPWX2 decreases to 0 and the two clouds are located on the axis X.

From t7 to t12, symmetrical microwave powers are applied so that each cloud describes that portion not yet described of the path TZ in order to achieve travel of a closed path for each cloud.

During the time sequence from t0 to t12, the two clouds of atoms have described the path TZ in opposing directions, thereby making it possible to measure a rotational velocity Ωz as explained above.

To further increase the area contained within TZ, according to one variant, a sum signal is also used to activate the guide CPWY1' (and therefore simultaneously the power applied to CPWY1 is decreased) as illustrated in FIG. **17*b*, in which the steps of the movement take place from t0 to t14**. The clouds are repelled even further from Y.

Throughout the entire time sequence of the movement of the clouds along the first path TZ (and their recombination), the current applied to the two wires has remained constant ($I_{W1}$ at W1 and $I_{W2}$ at W2), and the movement is driven only by the application of the microwave signals to the various waveguides of the chip Ach. Since the currents in W1 and W2 and the homogeneous field 20 do not change during the sequence, the DC magnetic trap does not move (unlike in document WO2017089489, where one wire is gradually deactivated so as to activate another one, this having the effect of moving the DC magnetic trap). In the invention, it is only the changes in the microwave fields (power, frequency and guide in which they propagate) that make it possible to move the two dressed traps and therefore to move the atoms.

Thus, in the separation/movement interferometry time sequence according to a first embodiment for the measurement about Z, at least the guides along X of the first pair closest to the axis X (CPWX1, CPWX2) are passed through simultaneously by microwave signals with angular frequencies ωa or ωb, at certain times called first set of times E1. In the example of FIG. 16: {t1, t5, t7, t11}.

As a variant, as illustrated in FIG. 16, the guides along X of the other first pairs are also successively passed through simultaneously by microwave signals with angular frequencies ωa or ωb, at certain times different from the first set of times. In FIG. 16: {t2, t3, t4, t8, t9, t10} for CPWX1' CPWX2'.

In addition, at least one of the guides along Y' of at least the second pair closest to Y' is passed through by a microwave signal formed by the superposition of a microwave signal at an angular frequency ωa' and a microwave signal with an angular frequency ωb', at certain times called second set of times E2. In the example of FIG. 16: CPWY2 at {t3, t9}.

As a variant, as also illustrated in FIG. 16, the other guide along Y' of the second pair closest to Y' is also passed through by a microwave signal formed by the superposition of a microwave signal at an angular frequency ωa' and a microwave signal with an angular frequency ωb', at certain times different from second set. In the example of FIG. 16: CPWY1 at {t4, t5, t6, t7, t8}.

E2 in certain cases (not those from the example of FIG. 16) has times in common with the first set of times E1.

As a variant, as illustrated in FIG. **17*b***, the guide along Y' of the pair furthest from Y' situated on the same side as the guide along Y' that was previously activated is then activated. The successive activation of the guides along Y' on one and the same side makes it possible to repel the clouds further.

Furthermore, the one or more conductive wires are each flowed through by a constant current during the separation, the movement and the recombination of said traps.

Thus, in this first embodiment, the two clouds have been separated with respect to X and the two clouds have been jointly repelled with respect to Y.

Figure 18:
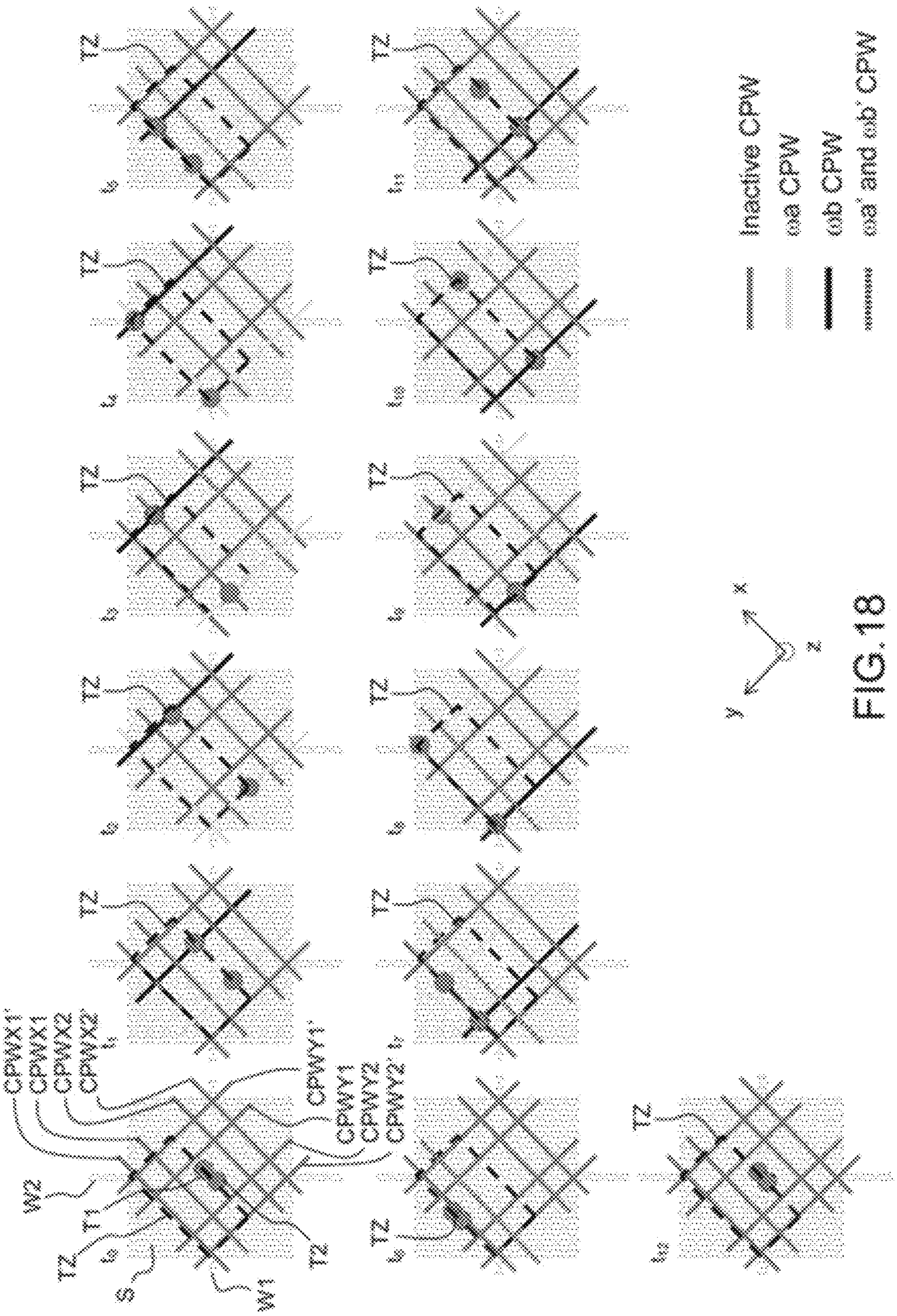
FIG. 18 illustrates a second embodiment of a path TZ through movement of the two trapped clouds, the movement being illustrated at various times t0 to t12 of the addressing time sequence.

According to a second embodiment, for the measurement about Z, a path TZ is described by swapping the roles of X and Y, as illustrated in FIG. 18: separation takes place with respect to Y and repelling takes place along X.

Figure 19:
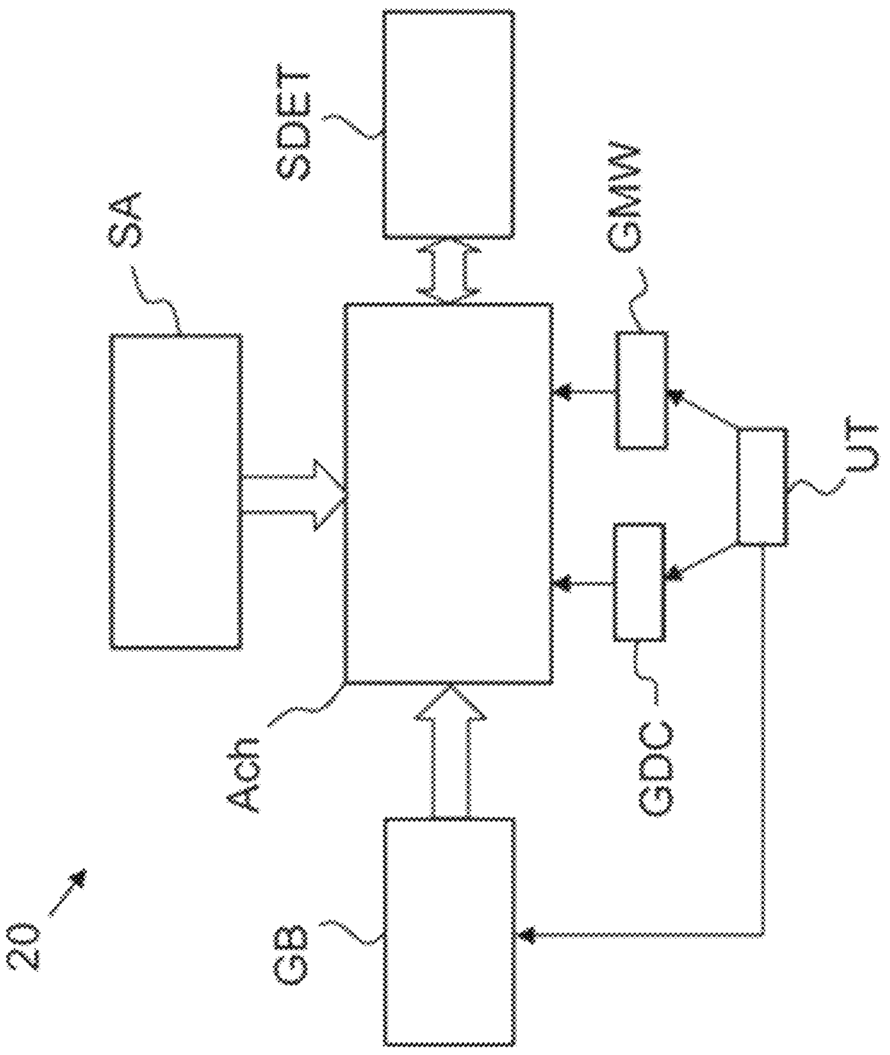
FIG. 19 illustrates an ultra-cold atom sensor according to the invention allowing a rotational velocity measurement along at least the axis Z.

According to a second aspect, the invention relates to an ultra-cold atom sensor 20 allowing a rotational velocity measurement along at least the axis Z as illustrated in FIG. 19.

The sensor 20 comprises an atom chip Ach as described above placed in a vacuum chamber (not shown) and an atom source SA designed to generate a cloud of ultra-cold atoms 12 close to the plane XY of the atom chip Ach. The ultra-cold atoms have, in the phase of initializing the implementation of the sensor, a superposition of internal states |a> and |b>.

The sensor 20 also comprises a generator GB for generating a homogeneous magnetic field B0, preferably parallel to the plane of the chip, at least one processor UT, at least one DC current or voltage generator GDC designed to control electric currents in said conductive wires and at least one microwave current or voltage generator GMW connected to said waveguides. There may typically be one generator GMW for the 8 guides, or 2 generators or 4 generators, etc. The waveguides along X and Y' and the conductive wires W1 and W2 are configured so as to perform the following steps when the sensor is implemented:

First of all, the energy of the ultra-cold atoms is modified so as to create a potential minimum for the ultra-cold atoms in the internal state |a> and a potential minimum for the ultra-cold atoms in the internal state |b>, thus forming a first ultra-cold atom trap T1 and a second ultra-cold atom trap T2, a trap making it possible to immobilize a cloud of ultra-cold atoms 12 in an internal state different from the other trap, at a controlled distance h from the measurement plane (same as steps A0 and B0).

Next, the two traps T1 and T2 are spatially separated and moved along a first closed path TZ contained within a plane perpendicular to Z travelled in one direction by the ultra-cold atoms of the first trap and in the opposite direction by the ultra-cold atoms of the second trap.

The sensor also comprises an optical intensity detection system SDET designed to measure at least one population of ultra-cold atoms in one of the internal states.

The sensor integrating an atom chip according to the invention makes it possible to obtain, by virtue of the "soft" trap and the microwave guides, greater separation of the atoms and an area contained within the path that is also greater in comparison with sensors from the prior art, and the sensor according to the invention is thus more sensitive to accelerations and rotations, thereby leading to a longer autonomous navigation time.

The chip Ach according to the invention also makes it possible to measure a rotational velocity Ωx along X with traps covering a second closed path TX situated in a plane perpendicular to X and to measure a rotational velocity Ωy along Y' with traps covering a third closed path TY' situated in a plane perpendicular to Y'.

For this purpose, according to a first embodiment, the interferometry sequence described in document FR2004743 is used, the switch from h1 to h2 in order to create the "vertical" paths TX and TY' being achieved by applying two-level DC signals to the two wires (see timing diagram of FIG. 6). The surface S reduces the difference between h1 and h2, and therefore the sensitivity of the sensor.

To overcome this problem, the inventors have developed a second embodiment using a novel interferometry sequence using sum signals. Specifically, the inventors have shown that applying these sum signals made it possible to "repel" the clouds of atoms upwards, i.e. towards positive Zs. The inventors have shown that the pushing force is not perfectly horizontal but contains a small vertical component, and when ωa (or ωa') is applied to CPWX1 and CPWX2 at the same time, the horizontal component is cancelled out and the effect of the vertical component is exacerbated. This has the effect of moving the state |a> away from the surface of the chip. Likewise, if ωb (or ωb') is applied, the state |b> is moved away from the chip. And therefore, when a sum signal that superposes ωa and ωb (or ωa' and ωb') is applied, the two states |a> and |b> are moved away from the chip. This effect therefore makes it possible to generate vertical paths.

Figure 20:
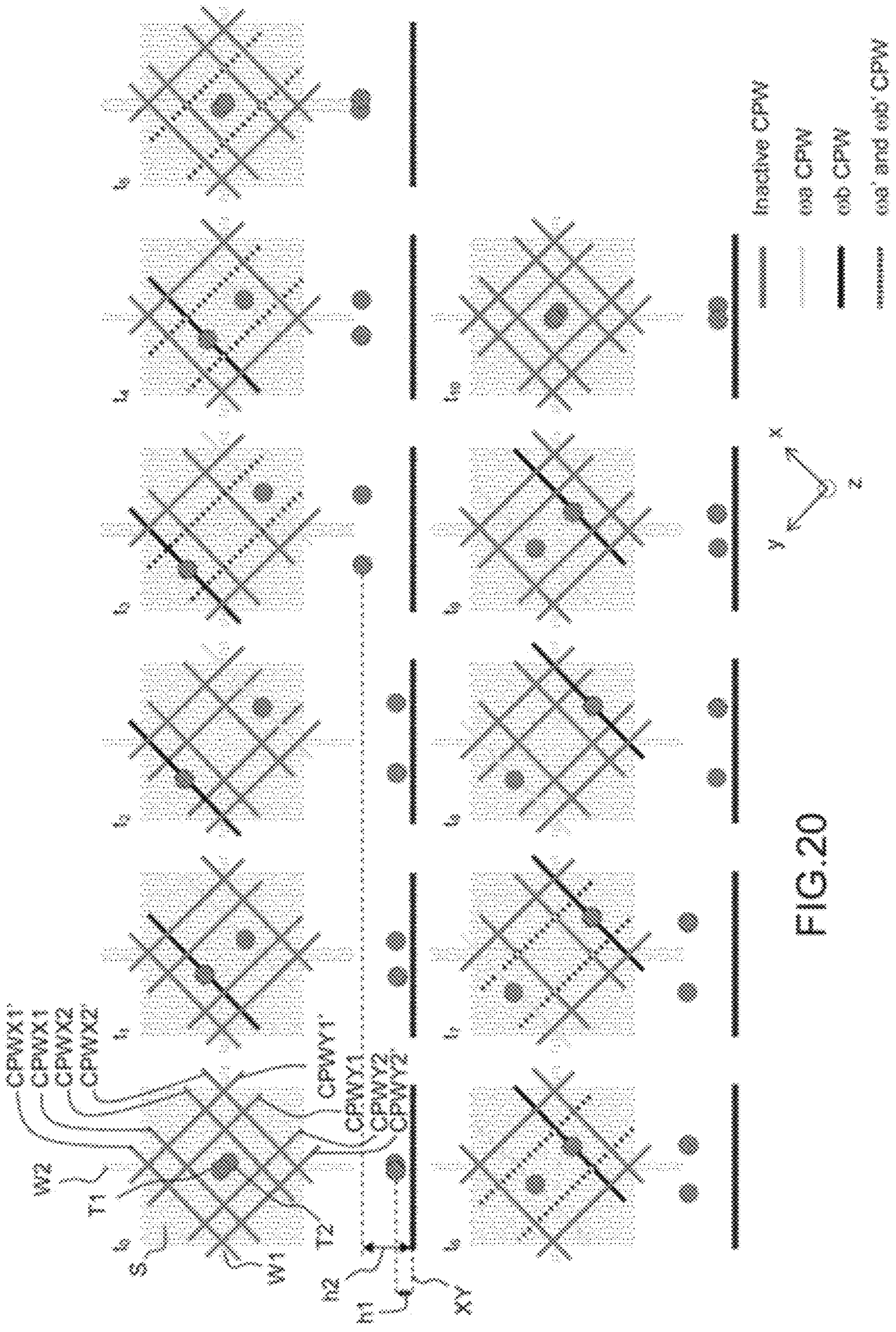
FIG. 20 illustrates one exemplary embodiment of a path TX for measuring a rotational velocity about the axis X.
Figure 21:
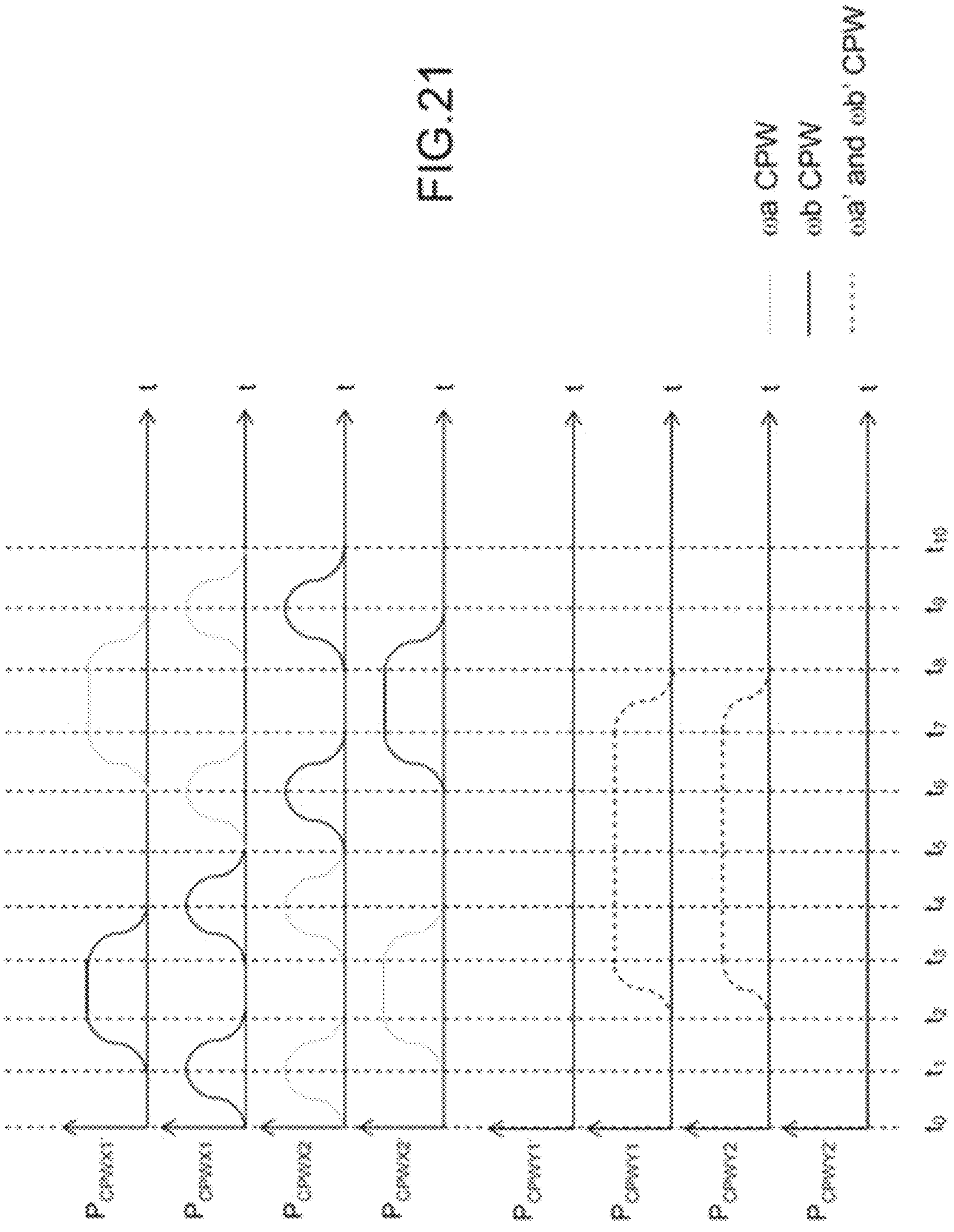
FIG. 21 illustrates the microwave powers applied to the guides in order to describe the path of FIG. 20, adopting the chip geometry from FIG. 16.

One exemplary embodiment of a path TX is illustrated in FIG. 20, and the corresponding timing diagram of the microwave powers applied to the guides is illustrated in FIG. 21, adopting the chip geometry from FIG. 16.

Between t0 and t1, and between t1 and t2, the sequence is identical to FIG. 16.

Once the clouds have been separated along X, between t2 and t3, a sum signal [a'+b'] is gradually applied simultaneously to the two guides along Y CPWY1 and CPWY2 until reaching a maximum value at t2. This simultaneous application of the sum signal to the two guides along Y leads to the clouds moving away from the initial plane, making it possible to switch from a first height h1 to a second height h2 for the clouds of atoms 12, without modifying their position in terms of x and y.

From t3 to t4 and from t4 to t5, the clouds move closer to X in the same way as t4-t5-t6 in FIG. 16, through a decrease in the microwave signal applied to the two guides along X that are furthest away CPWX1' CPWX2' while at the same time increasing the signal applied to the two guides along X that are closest to X CPWX1 CPWX2, and then by decreasing the signal applied to these two guides along X that are closest to X.

Next, from t5 to t6, by inverting the frequencies that are applied, the clouds intersect and "move to the other side" of X.

From t7 to t8, the gradual reduction of the sum signal applied to the two guides along Y' causes the two clouds to descend back to h1, and then from t8 to t9 and from t9 to t10 the gradual reduction of the single-frequency signals successively applied to the guides along X that are furthest away, and then closest to X, leads to the clouds moving closer to the point O and at t10 they are located plumb thereto.

Throughout the entire sequence, the wires W1 and W2 have been subject respectively to a current Iw1 and Iw2 of constant value, the two values not necessarily being identical.

This thus created a path TX perpendicular to the axis X as illustrated in FIG. 5 by simultaneously applying microwave signals with angular frequencies ωa or ωb to at least the guides along X of the first pair closest to X (CPWX1, CPWX2), at certain times called third set of times E3. In the example of FIG. 20 {t1, t4, t6, t9}.

According to one variant, in order to increase the area contained within the path TX, the guides along X of the other first pairs (CPWX1', CPWX2' in FIG. 20) are successively passed through simultaneously by microwave signals with angular frequencies ωa or ωb, at certain times different from the third set of times. In FIG. 20: {t2, t3, t7, t8}.

In addition, the guides along Y' of the second pair closest to the axis Y' are simultaneously passed through by a microwave signal formed by the superposition of a microwave signal at an angular frequency ωa' and a microwave signal with an angular frequency ωb' in order to switch from the first height to the second height, at certain times called fourth set times E4. In the example of FIG. 20 {t3, t4, t5, t6, t7}. E4 has times in common with E3.

Furthermore, the one or more conductive wires are each flowed through by a constant current during the separation, the movement and the recombination of said traps.

Figure 22:
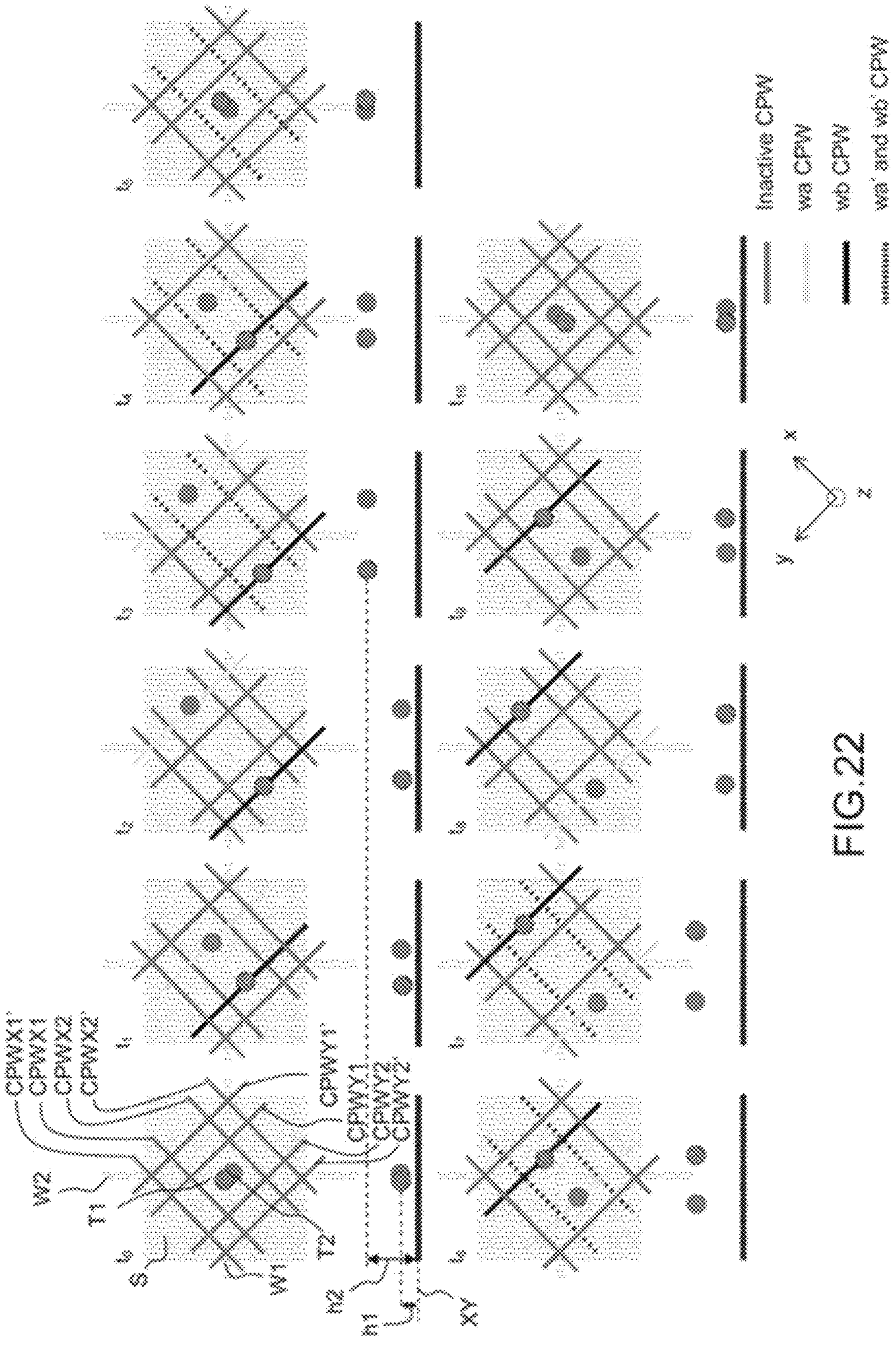
FIG. 22 illustrates the creation of a path TY adopting the chip geometry from FIG. 16 and in the same spirit as for TX.

Likewise, FIG. 22 illustrates the creation of a path TY adopting the chip geometry from FIG. 16 and in the same spirit as for TX.

Thus, in the sequence of generating TY:

at least the guides along Y' of the second pair closest to the axis Y' are passed through simultaneously by microwave signals with angular frequencies ωa' or ωb', at certain times called third set of times.

According to one variant, in order to increase the area contained within the path TY, the guides along Y' of the other first pairs (CPWY1', CPWY2' in FIG. 22) are successively passed through simultaneously by microwave signals with angular frequencies ωa or ωb, at certain times different from the third set of times.

the waveguides along X of the first pair closest to X are simultaneously passed through by a microwave signal formed by the superposition of a microwave signal at an angular frequency ωa and a microwave signal with an angular frequency ωb in order to switch from the first height to the second height, at certain times called fourth set of times having times in common with the third set of times.

the one or more conductive wires are each flowed through by a constant current during the separation, the movement and the recombination of said traps.

The very important advantage of the sensor 20 integrating a chip Ach according to the invention is that of forming a 3-axis gyroscopic sensor with a simple geometry with 8 waveguides and two conductive wires. The originality of the sensor according to the invention is firstly the geometry of the chip and secondly applying, when it is implemented, to certain waveguides and at certain times, a sum signal as defined above while applying a signal of constant amplitude to the conductive wires.

This same sensor also allows a clock measurement and an acceleration measurement along the two axes X and Y'. To measure an acceleration along a measurement axis, it is necessary to make the two clouds pass through a straight segment perpendicular to the measurement axis. By way of example, it is possible simply to use the single-frequency signal on each guide along X to separate the two clouds.

According to a third aspect, the invention relates to a method for measuring a rotational velocity about an axis X, Y' or Z, called measurement axis, for example an ultra-cold atom sensor comprising an atom chip according to the invention. The method comprises the steps of:

A Generating a cloud of said ultra-cold atoms (12), including phases of dispersing said atoms, of cooling said atoms, of initializing said atoms in at least one internal state |a> and of trapping a cloud of said ultra-cold atoms in a local potential minimum, B Initializing the internal states by coherently superposing said ultra-cold atoms between said states |a> and |b> through a first pulse π/2;

C Spatially separating a cloud of said atoms with said internal state |a> in a trap (T1) from a cloud of said atoms with said internal state |b> in another trap (T2), and moving said traps in opposing directions along a closed path contained within a plane perpendicular to the measurement axis and initialized from the point O:

by applying a predetermined microwave-frequency current or voltage to said waveguides in a predetermined sequence, and by applying a constant DC current or voltage value to the first and where appropriate the second conductive wires, D Recombining said internal states |a> and |b> by applying a second pulse π/2 to said ultra-cold atoms and then measuring the density of atoms in an internal state chosen from among at least |a> and |b>;

E Determining the Sagnac phase of said ultra-cold atoms and calculating the rotational velocity of said sensor along said measurement axis.

In order to measure a rotational velocity about the axis Z, during step C, the sequence includes applying, at certain times, a microwave signal formed by the superposition of a microwave signal at an angular frequency ωa and a microwave signal with an angular frequency ωb to at least one of the guides along X of at least the first pair closest to the axis X, or applying a microwave signal formed by the superposition of a microwave signal at an angular frequency ωa' and a microwave signal with an angular frequency ωb' to at least one of the guides along Y' of at least the second pair closest to the axis Y'.

In order to measure a rotational velocity about the axis X or the axis Y', during step C, the sequence includes:

in order to measure the rotational velocity about the axis X, applying, at certain times, a microwave signal formed by the superposition of a microwave signal at an angular frequency ωa and a microwave signal with an angular frequency ωb, simultaneously to the two guides along X of the first pair closest to the axis X, in order to measure the rotational velocity about the axis Y', applying, at certain times, a microwave signal formed by the superposition of a microwave signal at an angular frequency ωa' and a microwave signal with an angular frequency ωb', simultaneously to the two guides along Y' of the second pair closest to the axis Y'.

For the embodiment of the atom chip comprising two conductive loading wires W1C and W2C, in step A, the clouds of ultra-cold atoms are trapped close to the atom chip with the loading wires. These are activated in order to transfer the cloud of atoms from the primary trap (or MOT: magneto-optical trap) plumb to the intersection of the two wires W1C and W2C, via the trap created with the superposition of the magnetic fields induced by the currents flowing in the loading wires W1C and W2C and the homogeneous field. Next, the current applied to the loading wires is gradually cut off and the trap created by the currents in the wires W1 (and W2) is gradually activated. For this purpose, the currents in W1C and W2C are gradually deactivated and, in parallel, the currents in W1 and W2 are gradually activated. During this transfer, the value of the homogeneous field may vary.

When W1C and W2C are not present on the atom chip, then the transfer from the primary trap to plumb to the intersection of W1 and W2 (in the same way as plumb to the intersection of the wires W1C and W2C) takes place directly (not via the loading wires).

According to a fourth aspect, the invention relates to a matrix atom chip in which each element of the matrix forms an elementary chip according to the invention as described above.

Figure 23:
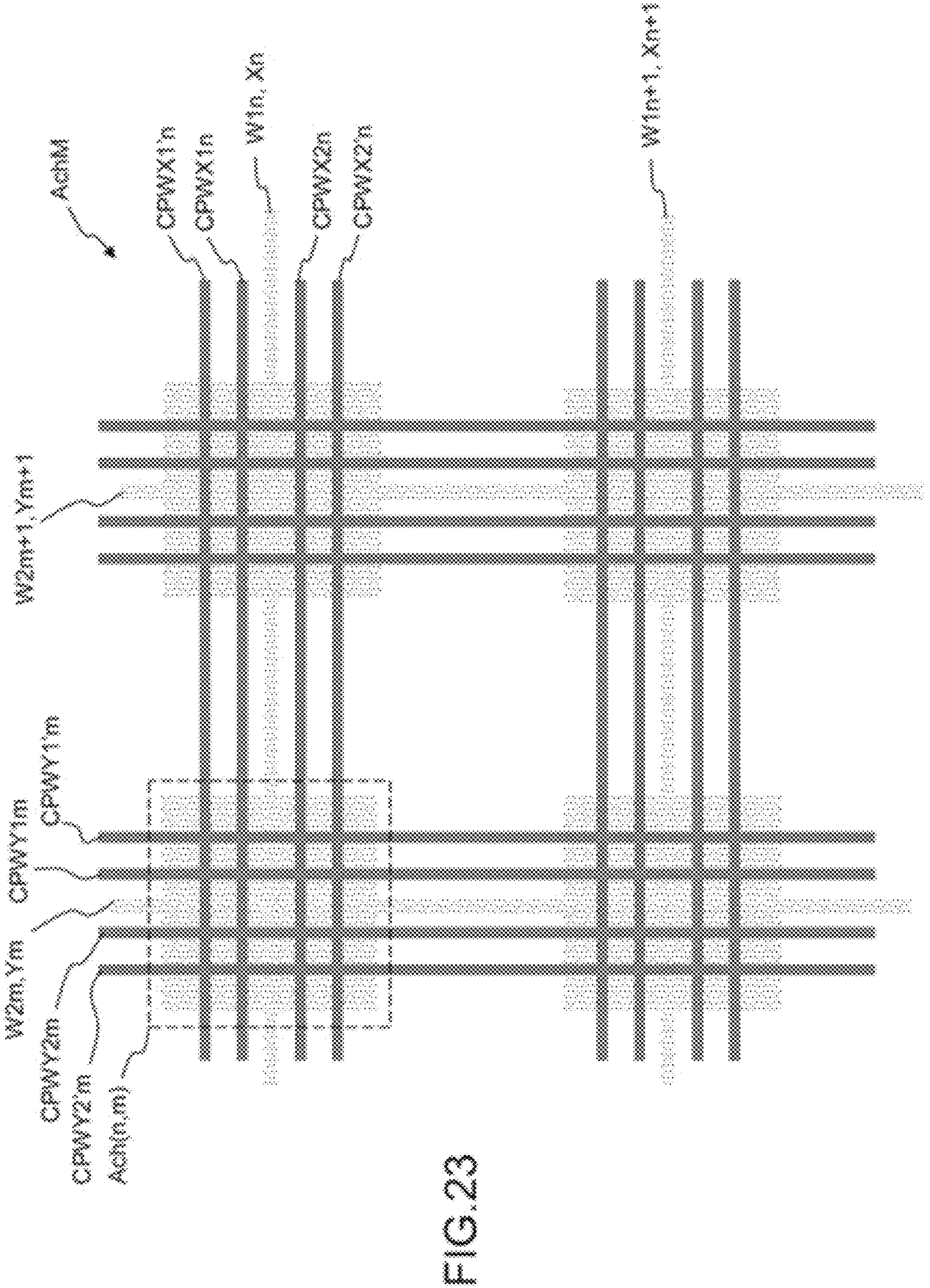
FIG. 23 illustrates a first variant of a matrix atom chip according to the invention.

Four elements of a first variant of a matrix chip AchM are illustrated in FIG. 23. The matrix chip comprises a first set of N first conductive wires W1*n* indexed n and a second set of M second conductive wires W2*m* indexed m that are perpendicular to one another and respectively form the N rows and the M columns of the matrix.

Each of the first conductive wires Win and the second conductive wires W2*m* indexed m are coincident respectively with an axis Xn indexed n and an axis Ym indexed m. The various first pairs of guides along Xn are thus common to all of the pixels of the row n and the various second pairs of guides along Ym are thus common to all of the pixels of the column m, each pixel of the matrix forming an elementary chip Ach(n,m). The elementary chips arranged in a matrix are located on the same substrate.

Figure 24:
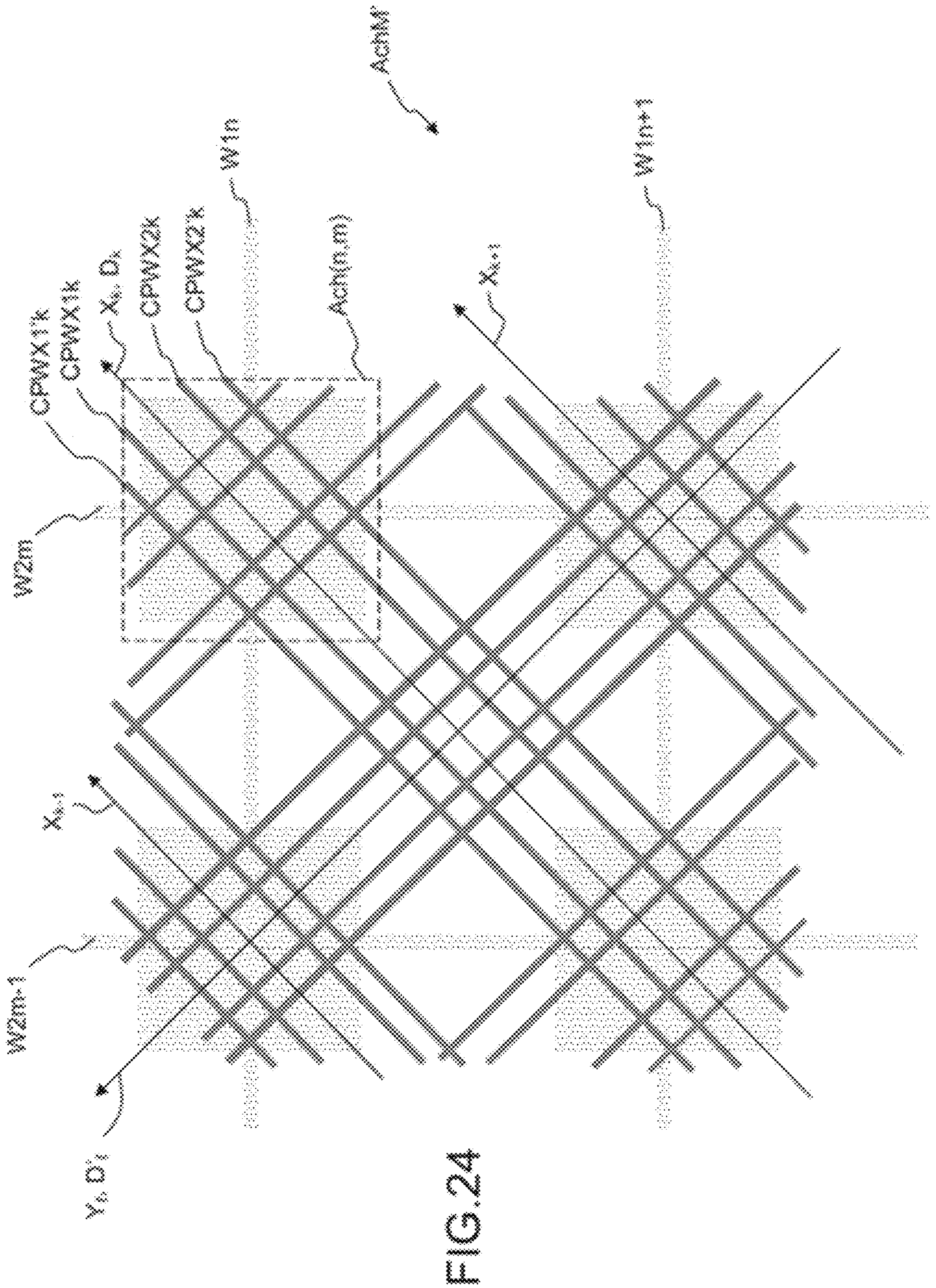
FIG. 24 illustrates a second variant of a matrix atom chip according to the invention.

Four elements of a second variant of a matrix chip AchM' are illustrated in FIG. 24. The matrix chip AchM' comprises a first set of N first conductive wires Win indexed n and a second set of M second conductive wires W2*m* indexed m that are perpendicular to one another and respectively form N rows and M columns of a matrix. Axes Xk indexed k are defined along first diagonals Dk of the matrix and axes YI indexed I are defined along second diagonals D'I perpendicular to the first diagonals.

The matrix chip also comprises first pairs of waveguides along each axis Xk and second pairs of waveguides along each axis YI. Each pixel of the matrix forms an elementary chip (Ach(n,m)).

According to another aspect, the invention relates to an ultra-cold atom sensor integrating a matrix chip according to the invention. Integrated into a sensor, the elementary chips make it possible to perform, in parallel, multiple measurements of at least one variable chosen from among: ax, ay, Ωx, Ωy, Ωz. They may also measure a time t. The measurements performed in parallel take into account the sequences applied to the waveguides.

The elementary chips are also reconfigurable so as to be able to perform other measurements in another sequence. The matrix chip is reconfigured according to requirements: the desired type of measurement (ax, ay, Ωx, Ωy, Ωz, t), the desired accuracy (dependent on the number of chips simultaneously performing the measurement), etc. Parallel, redundant and/or additional measurements are thus performed on one and the same matrix chip.

The invention claimed is:

1. A method for measuring a rotational velocity about at least one axis called measurement axis, using an ultra-cold atom sensor comprising an atom chip, said atom chip being placed in a vacuum chamber and comprising a measurement plane XY defined by an axis X and an axis Y that are orthogonal, said measurement plane being normal to an axis Z, the atom chip comprising:

a plurality of first pairs of waveguides, a first pair consisting of a first (CPWX1, CPWX1') and a second (CPWX2, CPWX2') waveguide that are coplanar, parallel to one another and arranged symmetrically on either side of an axis whose projection in the plane XY is along the axis X, called pairs of guides along X, a plurality of second pairs of waveguides, a second pair consisting of a first (CPWY'1, CPWY'1') and a second (CPWY'2, CPWY'2') waveguide that are coplanar, parallel to one another and arranged symmetrically on either side of an axis whose projection in the plane XY is along an axis Y' different from the axis X, called pairs of guides along Y', the pairs of guides along X being electrically insulated from the pairs of guides along Y';

the projections in the plane XY of the first pair furthest from X and of the second pair furthest from Y' forming, at their intersection, a parallelogram (P) with a centre O, a first conductive wire (W1) having a projection in the plane XY along X or Y' or a diagonal (D1, D2) of said parallelogram, the first conductive wire being designed to be flowed through by a DC current, said first wire having a flaring so as to take the form of a surface(S) whose projection in the plane XY incorporates said parallelogram (P) and exhibits symmetry about the point O, the method comprising the steps of:

A Generating a cloud of said ultra-cold atoms, including phases of dispersing said atoms, of cooling said atoms, of initializing said atoms in at least one internal state |a> and of trapping a cloud of said ultra-cold atoms in a local potential minimum, B Initializing internal states by coherently superposing said ultra-cold atoms between said state a> and an internal state |b> different from |a> through a first pulse π/2;

C Spatially separating a cloud of said atoms with said internal state |a> in a trap (T1) from a cloud of said atoms with said internal state |b> in another trap (T2), and moving said traps in opposing directions along a closed path contained within a plane perpendicular to the measurement axis and initialized from the point O:

by applying a predetermined microwave-frequency current or voltage to said waveguides in a predetermined sequence, and by applying a constant DC current or voltage value to the first conductive wire and a second conductive wire, D Recombining said internal states |a> and |b> by applying a second pulse π/2 to said ultra-cold atoms and then measuring the density of atoms in an internal state chosen from among at least |a> and |b>;

E Determining the Sagnac phase of said ultra-cold atoms and calculating the rotational velocity of said sensor along said measurement axis.

2. A measurement method according to claim 1, in order to measure a rotational velocity about the axis Z, wherein, during step C, said sequence includes applying, at certain times, a microwave signal formed by the superposition of a microwave signal at an angular frequency ωa and a microwave signal with an angular frequency ωb to at least one of the guides along X of at least the first pair closest to the axis X, or applying a microwave signal formed by the superposition of a microwave signal at an angular frequency ωa' and a microwave signal with an angular frequency ωb' to at least one of the guides along Y' of at least the second pair closest to the axis Y'.

3. The measurement method according to claim 1, in order to measure a rotational velocity about the axis X or the axis Y', wherein, during step C, said sequence includes:

in order to measure the rotational velocity about the axis X, applying, at certain times, a microwave signal formed by the superposition of a microwave signal at an angular frequency ωa and a microwave signal with an angular frequency ωb, simultaneously to the two guides along X of the first pair closest to the axis X, in order to measure the rotational velocity about the axis Y', applying, at certain times, a microwave signal formed by the superposition of a microwave signal at an angular frequency ωa' and a microwave signal with an angular frequency ωb', simultaneously to the two guides along Y' of the second pair closest to the axis Y'.

4. The measurement method according to claim 1, the atom chip furthermore comprising a first (W1C) and a second (W2C) loading wire that are conductive and electrically insulated from the first wire and the second conductive wire, whose projections in the plane XY are secant at O, and wherein, in step A, the cloud of ultra-cold atoms is trapped close to the atom chip with said loading wires.

* * * * *